US010430885B1

(12) United States Patent
Brandmaier et al.

(10) Patent No.: US 10,430,885 B1
(45) Date of Patent: Oct. 1, 2019

(54) PROCESSING INSURED ITEMS HOLISTICALLY WITH MOBILE DAMAGE ASSESSMENT AND CLAIMS PROCESSING

(75) Inventors: Jennifer A. Brandmaier, Chicago, IL (US); Mark E. Faga, Evanston, IL (US); Robert H. Johnson, Hoffman Estates, IL (US); Daniel Koza, Hinsdale, IL (US); William Loo, Arlington Heights, IL (US); Clint J. Marlow, Barrington, IL (US); Kurt M. Stricker, Northfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/587,635

(22) Filed: Aug. 16, 2012

(51) Int. Cl.
*G06Q 40/08* (2012.01)

(52) U.S. Cl.
CPC .................................. *G06Q 40/08* (2013.01)

(58) Field of Classification Search
CPC .............................. G06Q 40/00; G06Q 40/08
USPC ................... 705/4; 703/8; 702/108; 707/705
See application file for complete search history.

(56) References Cited

U.S. PATENT DOCUMENTS

| | | | |
|---|---|---|---|
| 4,899,292 A | 2/1990 | Montagna et al. | |
| 5,128,859 A | 7/1992 | Carbone et al. | |
| 5,317,503 A | 5/1994 | Inoue | |
| 5,432,904 A | 7/1995 | Wong | |
| 5,504,674 A | 4/1996 | Chen et al. | |
| 5,950,169 A | 9/1999 | Borghesi et al. | |
| 6,141,611 A * | 10/2000 | Mackey et al. | 701/32.2 |
| 6,185,540 B1 | 2/2001 | Schreitmueller et al. | |
| 7,092,369 B2 | 8/2006 | Fuccello et al. | |

(Continued)

FOREIGN PATENT DOCUMENTS

| | | | |
|---|---|---|---|
| CN | 1828336 | * | 9/2006 |
| EP | 1215612 A1 | | 6/2002 |

(Continued)

OTHER PUBLICATIONS

Ying Li et al. "Applying Image Analysis to Auto Insurance Triage: A Novel Application" Oct. 1-3, 2007. Institute of Electrical and Electronics Engineers, MMSP 2007 Proceedings, Chania, Crete, Greece. pp. 280-283.*

(Continued)

*Primary Examiner* — Kelly S Campen
(74) *Attorney, Agent, or Firm* — Banner & Witcoff, Ltd.

(57) ABSTRACT

Systems and methods provide for an automated system for analyzing damage and processing claims associated with an insured item, such as a vehicle. An enhanced claims processing server may analyze damage associated with the insured item using photos/video transmitted to the server from a user device (e.g., a mobile device). The mobile device may receive feedback from the server regarding the acceptability of submitted photos/video, and if the server determines that any of the submitted photos/video is unacceptable, the mobile device may capture additional photos/video until all of the data are deemed acceptable. To aid in damage analysis, the server may also interface with various internal and external databases storing reference images of undamaged items and cost estimate information for repairing previously analyzed damages to similar items. Further still, the server may generate a payment for compensating a claimant for repair of the insured item.

20 Claims, 13 Drawing Sheets

(56) References Cited

U.S. PATENT DOCUMENTS

| | | | |
|---|---|---|---|
| 7,197,444 | B2 | 3/2007 | Bomar, Jr. et al. |
| 7,203,654 | B2 | 4/2007 | Menendez |
| 7,263,493 | B1 | 8/2007 | Provost et al. |
| 7,324,951 | B2 | 1/2008 | Renwick et al. |
| 7,346,523 | B1 | 3/2008 | Provost et al. |
| 7,432,938 | B1 | 10/2008 | Reuter et al. |
| 7,586,654 | B2 | 9/2009 | Hoberock |
| 7,702,529 | B2 | 4/2010 | Wahlbin et al. |
| 7,734,485 | B1 | 6/2010 | Bohanek |
| 7,809,587 | B2 * | 10/2010 | Dorai et al. ............ 705/4 |
| 7,873,710 | B2 | 1/2011 | Kiley et al. |
| 7,889,931 | B2 | 2/2011 | Webb et al. |
| 7,953,615 | B2 | 5/2011 | Aquila et al. |
| 7,962,485 | B1 | 6/2011 | Trandal et al. |
| 8,015,036 | B1 * | 9/2011 | Leisure ............ 705/4 |
| 8,019,629 | B1 | 9/2011 | Medina, III et al. |
| 8,035,639 | B2 | 10/2011 | Witte |
| 8,081,795 | B2 | 12/2011 | Brown |
| 8,095,394 | B2 * | 1/2012 | Nowak et al. ............ 705/4 |
| 8,239,220 | B2 * | 8/2012 | Kidd et al. ............ 705/4 |
| 8,306,258 | B2 | 11/2012 | Brown |
| 8,510,196 | B1 | 8/2013 | Brandmaier et al. |
| 8,650,106 | B1 | 2/2014 | Hopkins, III |
| 8,712,893 | B1 | 4/2014 | Brandmaier et al. |
| 2002/0002475 | A1 * | 1/2002 | Freedman et al. ............ 705/4 |
| 2002/0055861 | A1 * | 5/2002 | King et al. ............ 705/4 |
| 2002/0161533 | A1 | 10/2002 | Uegaki |
| 2002/0188479 | A1 | 12/2002 | Renwick et al. |
| 2003/0219169 | A1 | 11/2003 | Sartor et al. |
| 2004/0064345 | A1 | 4/2004 | Ajamian et al. |
| 2004/0153346 | A1 | 8/2004 | Grundel et al. |
| 2005/0125127 | A1 | 6/2005 | Bomar et al. |
| 2005/0228683 | A1 | 10/2005 | Saylor et al. |
| 2005/0246108 | A1 | 11/2005 | Fournier |
| 2005/0251427 | A1 | 11/2005 | Dorai et al. |
| 2006/0080154 | A1 | 4/2006 | Larsen |
| 2008/0052134 | A1 * | 2/2008 | Nowak et al. ............ 705/4 |
| 2008/0059238 | A1 | 3/2008 | Park et al. |
| 2008/0255887 | A1 * | 10/2008 | Gruter ............ 705/4 |
| 2008/0267487 | A1 | 10/2008 | Siri |
| 2009/0018859 | A1 | 1/2009 | Purifoy et al. |
| 2009/0018874 | A1 | 1/2009 | Blair et al. |
| 2009/0100106 | A1 | 4/2009 | Anthony et al. |
| 2009/0138290 | A1 | 5/2009 | Holden |
| 2009/0147988 | A1 | 6/2009 | Jones et al. |
| 2009/0234678 | A1 | 9/2009 | Arenas |
| 2009/0265193 | A1 | 10/2009 | Collins et al. |
| 2009/0309893 | A1 | 12/2009 | Boothroyd et al. |
| 2010/0036683 | A1 | 2/2010 | Logan |
| 2010/0066012 | A1 | 3/2010 | Yamazaki et al. |
| 2010/0088123 | A1 | 4/2010 | McCall et al. |
| 2010/0138298 | A1 | 6/2010 | Fitzgerald et al. |
| 2010/0174564 | A1 | 7/2010 | Stender et al. |
| 2011/0040692 | A1 | 2/2011 | Ahroon |
| 2011/0054806 | A1 | 3/2011 | Goldfine et al. |
| 2011/0161100 | A1 | 6/2011 | Peak et al. |
| 2011/0161116 | A1 | 6/2011 | Peak et al. |
| 2011/0161117 | A1 | 6/2011 | Busque et al. |
| 2011/0161118 | A1 | 6/2011 | Borden et al. |
| 2011/0196707 | A1 | 8/2011 | Danico et al. |
| 2011/0213628 | A1 | 9/2011 | Peak et al. |
| 2011/0218825 | A1 | 9/2011 | Hertenstein |
| 2011/0270641 | A1 | 11/2011 | Rossmark et al. |
| 2011/0313936 | A1 | 12/2011 | Sieger |
| 2011/0313951 | A1 | 12/2011 | Cook |
| 2012/0066012 | A1 | 3/2012 | Brown |
| 2012/0290333 | A1 | 11/2012 | Birchall |
| 2012/0297337 | A1 | 11/2012 | St. Denis et al. |
| 2014/0122133 | A1 | 5/2014 | Weisberg et al. |
| 2014/0229207 | A1 | 8/2014 | Swamy et al. |
| 2015/0363717 | A1 | 12/2015 | Lim |

FOREIGN PATENT DOCUMENTS

| | | | |
|---|---|---|---|
| JP | 2000050156 | * | 2/2000 |
| JP | 2010157267 A | | 7/2010 |
| KR | 2002008466 A | | 1/2002 |
| KR | 2006031208 A | | 4/2006 |
| WO | 2010026170 A1 | | 3/2010 |
| WO | 2011157064 A1 | | 12/2011 |
| WO | 2012113084 A1 | | 8/2012 |
| WO | 2013003957 A1 | | 1/2013 |

OTHER PUBLICATIONS

DiTullio, Angelo."How Can We Stop Insurers Writing Estimates from Photos." Apr. 19, 2016. through Babcox Media, Inc. BodyShop Business 35.4/ Magazine/Journal 2 pages.*

Mort et al. "Marketing m-services: Establishing a usage benefit typology related to mobile user characteristics" Jul. 2005, Journal of Database Marketing & Customer Strategy Management, vol. 12, Issue 4, pp. 327-341.*

Office Action received in corresponding U.S. Appl. No. 13/587,620 dated Feb. 27, 2013.

Download our pocket agent app for iPhone today; retrieved from https://www.statefarm.com/about-us/innovation-research/mobile-apps/pocket-agent-for-iphone/; Copyright, State Farm Mutual Automobile Insurance Company, 2013.

Security First Mobile, downloaded from http://www.securityfirstflorida.com/security-first-mobile/, Copyright 2014 Security First Insurance Company.

Get the Nationwide Mobile App for Android and iPhone, downloaded from http://www.nationwide.com/mobile-support.jsp, 2014 Nationwide Mutual Insurance Company amd Affiliated Companies.

Welcome to USAA! To get started, please enable cookies, downloaded from https://www.usaa.com/inet/pages/mobile_access_methods_mobileapps?akredirect=true, 2013 USAA.

Farmers iClaim, downloaded from http://www.farmers.com/iclaim.html, 2014 Farmers Insurance Company.

Imaging Technology Saves the Day for Insurance Claim Processing; downloaded from www.snowbound.com/resources/articles/business-benefits-industry-information/imaging-technology-saves-day-insurance; 2013 Snowbound Software.

Feb. 12, 2016—U.S. Non-Final Office Action—U.S. Appl. No. 14/341,043.

Feb. 16, 2016—U.S. Non-Final Office Action—U.S. Appl. No. 14/341,139.

Mar. 1, 2016—U.S. Final Office Action—U.S. Appl. No. 14/076,473.

Apr. 25, 2016—U.S. Non-Final Office Action—U.S. Appl. No. 13/587,630.

Apr. 5, 2016—U.S. Non-Final Office Action—U.S. Appl. No. 13/892,598.

Jun. 2, 2016—U.S. Non-Final Office Action—U.S. Appl. No. 13/587,635.

Feb. 23, 2016—U.S. Final Office Action—U.S. Appl. No. 13/587,635.

Jun. 13, 2016—U.S. Non-Final Office Action—U.S. Appl. No. 14/076,473.

Jun. 17, 2016—U.S. Non-Final Office Action—U.S. Appl. No. 14/063,517.

May 23, 2016 U.S. Non-Final Office Action—U.S. Appl. No. 14/190,976.

Jul. 12, 2016—U.S. Final Office Action—U.S. Appl. No. 13/587,630.

Jul. 29, 2016—U.S. Non-Final Office Action—U.S. Appl. No. 13/834,170.

Aug. 1, 2016—U.S. Non-Final Office Action—U.S. Appl. No. 13/834,161.

Aug. 3, 2016—U.S. Non-Final Office Action—U.S. Appl. No. 14/671,602.

Aug. 29, 2016—U.S. Non-Final Office Action—U.S. Appl. No. 13/834,210.

Sep. 15, 2016—U.S. Final Office Action—U.S. Appl. No. 14/063,517.

Nov. 4, 2016—U.S. Final Office Action—U.S. Appl. No. 13/834,170.

Nov. 10, 2016—U.S. Non-Final Office Action—U.S. Appl. No. 14/063,533.

(56) References Cited

OTHER PUBLICATIONS

Nov. 25, 2016—U.S. Non-Final Office Action—U.S. Appl. No. 14/671,617.
Dec. 2, 2016—U.S. Final Office Action—U.S. Appl. No. 13/834,210.
Dec. 2, 2016—U.S. Final Office Action—U.S. Appl. No. 14/190,976.
Dec. 2, 2016—U.S. Non-Final Office Action—U.S. Appl. No. 14/269,387.
Oct. 13, 2016—U.S. Final Office Action—U.S. Appl. No. 13/834,161.
Oct. 13, 2016—U.S. Office Action—U.S. Appl. No. 13/933,576.
Oct. 17, 2016 U.S. Final Office Action—U.S. Appl. No. 13/892,598.
Oct. 18, 2016 U.S. Office Action—U.S. Appl. No. 14/671,602.
Oct. 21, 2016—U.S. Non-Final Office Action—U.S. Appl. No. 14/063,570.
Oct. 24, 2016—U.S. Non-Final Office Action—U.S. Appl. No. 13/834,193.
Dec. 1, 2017—U.S. Non-Final Office Action—U.S. Appl. No. 13/933,576.
Dec. 7, 2017—U.S. Non-Final Office Action—U.S. Appl. No. 14/671,617.
Dec. 8, 2017—U.S. Non-Final Office Action—U.S. Appl. No. 14/063,570.
Jan. 9, 2018 U.S. Non-Final Office Action—U.S. Appl. No. 13/892,598.
Jan. 12, 2018—U.S. Final Office Action—U.S. Appl. No. 13/834,161.
Jun. 20, 2018—U.S. Non-Final Office Action—U.S. Appl. No. 13/834,161.
Jun. 26, 2018—U.S. Final Office Action—U.S. Appl. No. 13/892,598.
Jul. 6, 2018—U.S. Final Office Action—U.S. Appl. No. 14/671,602.
Mar. 12, 2018—U.S. Non-Final Office Action—U.S. Appl. No. 14/063,517.
Mar. 9, 2018—U.S. Final Office Action—U.S. Appl. No. 14/269,387.
Mar. 14, 2018—U.S. Final Office Action—U.S. Appl. No. 13/834,170.
Mar. 14, 2018—U.S. Final Office Action—U.S. Appl. No. 13/834,210.
Mar. 16, 2018—U.S. Final Office Action—U.S. Appl. No. 14/063,570.
Mar. 16, 2018—U.S. Final Office Action—U.S. Appl. No. 13/933,576.
Mar. 21, 2018—U.S. Non-Final Office Action—U.S. Appl. No. 14/671,602.
Mar. 27, 2018—U.S. Non-Final Office Action—U.S. Appl. No. 15/855,057.
Mar. 30, 2018—U.S. Non-Final Office Action—U.S. Appl. No. 13/587,630.
Apr. 3, 2018—U.S. Final Office Action—U.S. Appl. No. 14/190,976.
Oct. 4, 2018—U.S. Final Office Action—U.S. Appl. No. 15/855,057.
Oct. 5, 2018—U.S. Final Office Action—U.S. Appl. No. 13/587,630.
Oct. 9, 2018—U.S. Final Office Action—U.S. Appl. No. 13/834,161.
Aug. 15, 2018—U.S. Non-Final Office Action—U.S. Appl. No. 13/834,170.
Sep. 5, 2018—U.S. Final Office Action—U.S. Appl. No. 14/063,517.
Sep. 4, 2018—U.S. Non-Final Office Action—U.S. Appl. No. 13/834,210.
Sep. 17, 2018—U.S. Non-Final Office Action—U.S. Appl. No. 13/933,576.
Sep. 21, 2018—U.S. Final Office Action—U.S. Appl. No. 14/671,617.
Feb. 21, 2019—U.S. Non-Final Office Action—U.S. Appl. No. 14/671,602.
Mar. 22, 2019—U.S. Non-Final Office Action—U.S. Appl. No. 13/587,630.
Mar. 20, 2019—U.S. Final Office Action—U.S. Appl. No. 14/063,570.
Mar. 22, 2019—U.S. Non-Final Office Action—U.S. Appl. No. 14/063,517.
Mar. 22, 2019—U.S. Non-Final Office Action—U.S. Appl. No. 14/671,617.
Mar. 20, 2019—U.S. Final Office Action—U.S. Appl. No. 13/834,210.
Apr. 12, 2019—U.S. Final Office Action—U.S. Appl. No. 13/933,576.
"Stereoscopic Imaging", https://www.Techopedia.com/definition/91/stereoscopic-imaging, retrieved on Apr. 7, 2019, Year 2019.
Sep. 13, 2017—U.S. Final Office Action—U.S. Appl. No. 14/063,517.
Sep. 18, 2017—U.S. Final Office Action—U.S. Appl. No. 13/892,598.
Sep. 25, 2017—U.S. Non-Final Office Action—U.S. Appl. No. 13/834,170.
Sep. 25, 2017—U.S. Non-Final Office Action—U.S. Appl. No. 13/834,161.
Oct. 6, 2017—U.S. Final Office Action—U.S. Appl. No. 13/587,630.
Oct. 20, 2017—U.S. Non-Final Office Action—U.S. Appl. No. 13/834,210.
Nov. 1, 2017—U.S. Final Office Action—U.S. Appl. No. 14/671,602.
Nov. 2, 2018—U.S. Non-Final Office Action—U.S. Appl. No. 14/269,387.
Nov. 9, 2018—U.S. Non-Final Office Action—U.S. Appl. No. 14/063,570.
Nov. 14, 2018—U.S. Non-Final Office Action—U.S. Appl. No. 13/892,598.
Jan. 14, 2019—U.S. Final Office Action—U.S. Appl. No. 13/834,170.
Feb. 6, 2019—U.S. Notice of Allowance—U.S. Appl. No. 14/190,976.
"How Can We Stop Insurers Writing Estimates from Photos", Angelo DiTullio, Babcox Media, Inc., BodyShop Business 35.4: 48(2), Apr. 2016.
May 9, 2017—U.S. Non-Final Office Action—U.S. Appl. No. 13/587,630.
May 16, 2017—U.S. Non-Final Office Action—U.S. Appl. No. 14/671,602.
May 18, 2017—U.S. Final Office Action—U.S. Appl. No. 14/671,617.
May 24, 2017—U.S. Non-Final Office Action—U.S. Appl. No. 14/063,517.
Jul. 10, 2017—U.S. Non-Final Office Action—U.S. Appl. No. 14/190,976.
Mar. 29, 2017—U.S. Final Office Action—U.S. Appl. No. 13/834,193.
Mar. 30, 2017—U.S. Final Office Action—U.S. Appl. No. 14/063,533.
Mar. 31, 2017—U.S. Final Office Action—U.S. Appl. No. 14/063,570.
Apr. 5, 2017—U.S. Non-Final Office Action—U.S. Appl. No. 13/892,598.
Apr. 6, 2017—U.S. Final Office Action—U.S. Appl. No. 13/933,576.
Mar. 13, 2017—U.S. Final Office Action—U.S. Appl. No. 14/269,387.

* cited by examiner

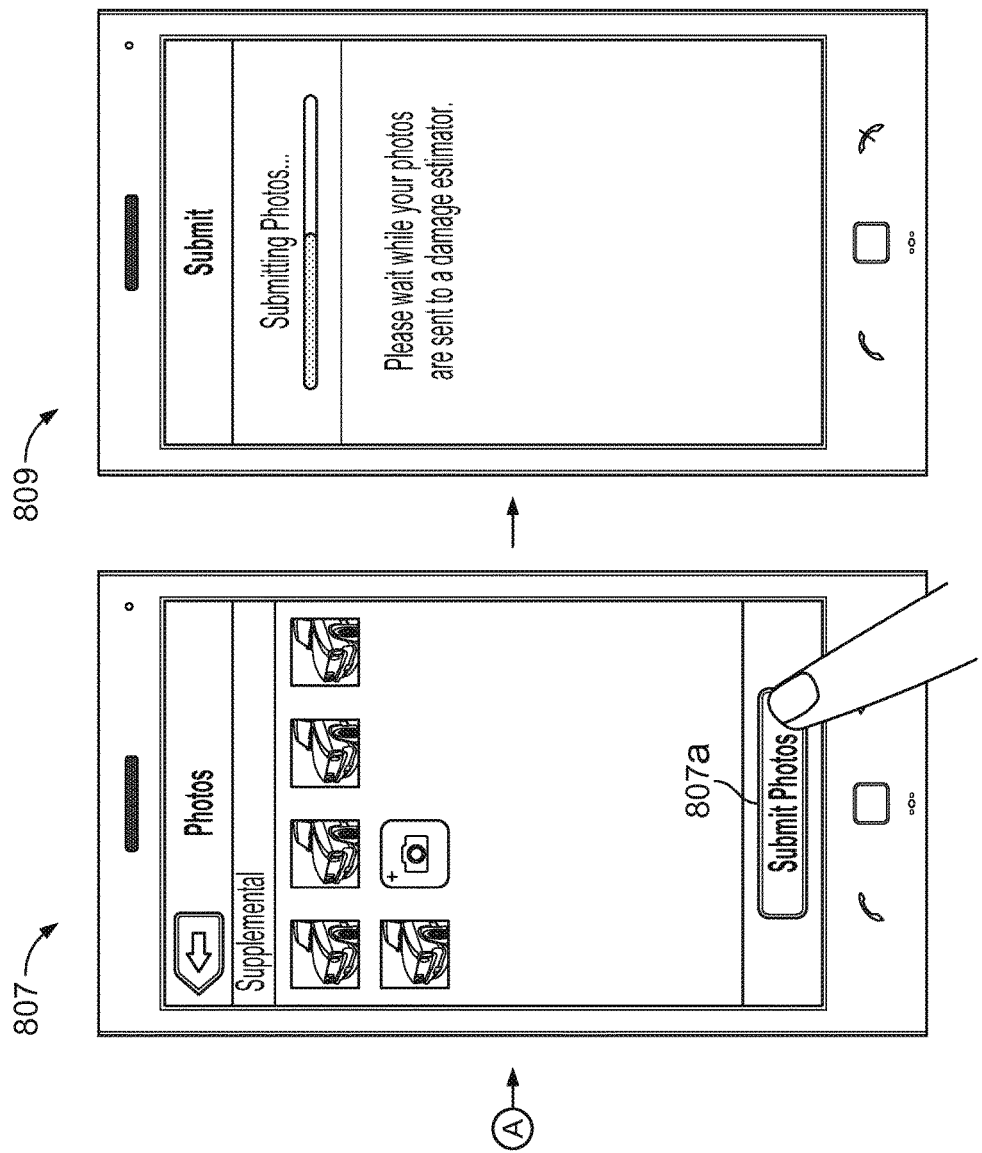

PROCESSING INSURED ITEMS HOLISTICALLY WITH MOBILE DAMAGE ASSESSMENT AND CLAIMS PROCESSING

CROSS-REFERENCE TO RELATED-APPLICATIONS

This application is related to U.S. application Ser. No. 13/587,620, filed Aug. 16, 2012 and U.S. application Ser. No. 13/587,630, filed Aug. 16, 2012, which were filed concurrently with this application and which are herein incorporated by reference in their entirety.

TECHNICAL FIELD

The present disclosure relates to systems and methods for analyzing damage to an insured item such as a vehicle and processing an insurance claim related to the analyzed damage.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve a streamlined and efficient process for claims management and disclose methods, computer-readable media, and apparatuses for automating the processing and settling of claims related to an insured item. A mobile device may transmit data (e.g., images, video, etc.) related to damage associated with an insured item to an enhanced claims processing server. The enhanced claims processing server may manage analysis of damage associated with the insured item and settlement of a claim related to the damage.

In another aspect of the disclosure, an enhanced claims processing server may analyze damage data received from a mobile device to generate a repair cost estimate for repairing the insured item.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

FIG. 8a shows the second part of a series of display screens displayed on a mobile device for enabling a user to receive feedback from an enhanced claims processing server regarding previously submitted photos, in accordance with certain aspects of the present disclosure.

DETAILED DESCRIPTION

In accordance with various aspects of the disclosure, methods, computer-readable media, and apparatuses are disclosed through which insurance claims may be settled through an enhanced automated process. In certain aspects, when an enhanced claims processing server receives data regarding an insured item (e.g., a vehicle, etc.) from a computing device (e.g., a mobile device), the server processes the data and manages settlement of a claim associated with the insured item.

The automated process may utilize various hardware components (e.g., processors, communication servers, memory devices, sensors, etc.) and related computer algorithms to generate image data related to damage associated with an insured item, determine if the image data conforms to a predetermined set of criteria, analyze the image data to assess loss associated with the insured item, and determine if a payment is appropriate to the claimant as compensation for assessed loss.

Figure 1:
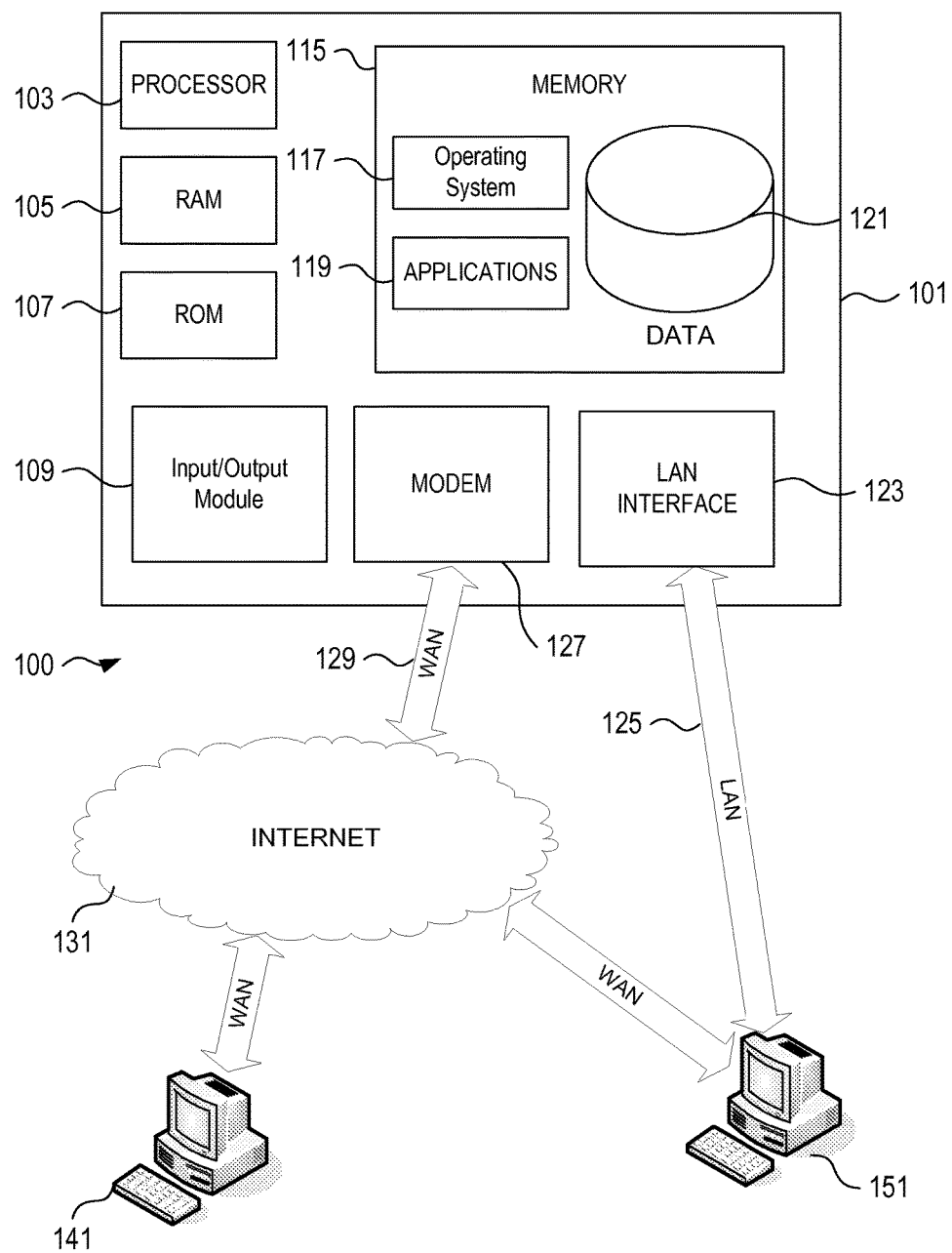
FIG. 1 shows an illustrative operating environment in which various aspects of the disclosure may be implemented.

FIG. 1 illustrates a block diagram of an enhanced claims processing server 101 (e.g., a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, touch screen, and/or stylus through which a user of enhanced claims processing server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze image data depicting damage to an insured item (e.g., vehicle, etc.). Processor 103 may determine the general location of damage associated with the vehicle by analyzing images of the vehicle and comparing these images with reference images of a similar vehicle with no damage or with similar damage. In addition, processor 103 may assess the loss associated with the damaged vehicle and transmit terms for settling an insurance claim related to the loss to a user of a mobile device.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent mobile devices with built-in cameras for capturing image data associated with a damaged item.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims processing server 101 according to an illustrative embodiment of the disclosure may include computer executable instructions for invoking functionality related to calculating an appropriate payment for assessed damage associated with an insured item.

Enhanced claims processing server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
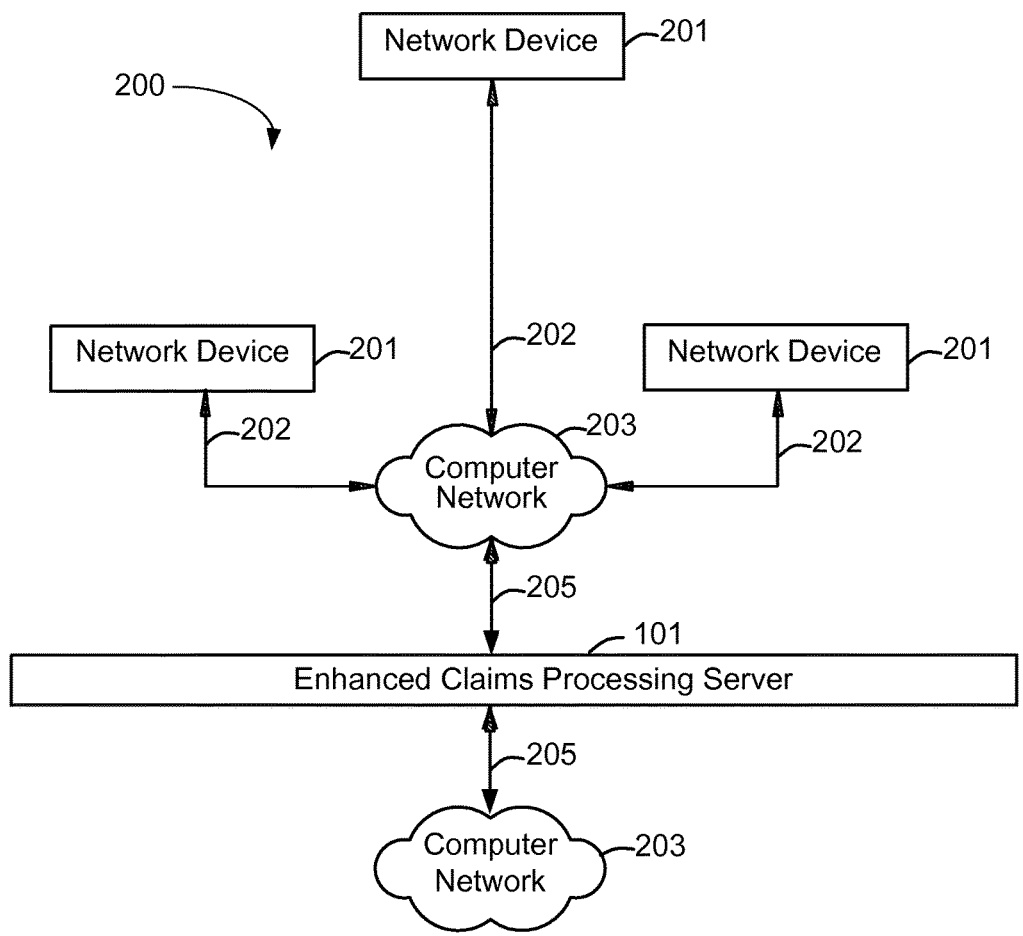
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to enhanced claims processing server 101. In certain embodiments, network devices 201 may run different algorithms used by server 101 for analyzing image data showing damage associated with an insured item, or, in other embodiments, network devices 201 may be data stores for storing reference image data of insured items. In yet other embodiments, network devices 201 may represent mobile user devices configured to capture image data (e.g., via a camera, etc.) associated with a damaged insured item and to transmit the image data to server 101. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, a user (e.g., a claimant) of a mobile device (e.g., mobile phone, personal digital assistant (PDA), etc.) may take a variety of photos associated with damage to an insured vehicle. The photos may include wide shots of the damaged vehicle, pictures of an identification number associated with the damaged vehicle (e.g., a vehicle identification number (VIN), etc.), and/or multiple angles/close-up shots of the damage associated with the insured vehicle.

Once the user is satisfied that the appropriate photos have been taken, the user may transmit the photos to an enhanced claims processing server 101. The enhanced claims processing server 101 may be configured to receive and analyze the photos to determine if they meet a predefined set of criteria (e.g., not too blurry, correct angles, etc.) for completeness, accuracy, etc. If the photos do not meet the minimum criteria, server 101 may transmit a message (e.g., via a feedback loop), informing the mobile device that alternative and/or additional photos must be taken. This process of assuring that the photos are compliant for further analysis may be repeated until the user of device 201 has complied with all of the rules set forth by enhanced claims processing server 101. Server 101 may then analyze the photos to generate an output, including a cost estimate to repair the damage associated with the insured vehicle and/or to replace a damaged part of the insured vehicle. In some aspects, to generate this output, server 101 may analyze the photos and determine the location of damage (e.g., exterior parts, etc.), extent of damage, and/or the cost of parts/labor to fix the damage.

In some instances, depending on the amount of damage to the insured vehicle, the cost estimate may represent the cost of replacing the insured vehicle itself. Along with the cost estimate for repair/replacement of the insured vehicle, server 101 may also output various claims documents, including disclosures, brochures, guarantees, etc. If appropriate, server 101 may transmit a payment to the user and/or to an account associated with the user, for the cost of repairing the damage or replacing a part. In addition, server 101 may inform the user approximately how long it will take to repair/replace the insured vehicle.

In some aspects, damage inspection and appraisal in the automated claims processing scheme discussed herein may be completed in thirty minutes or less.

Although embodiments of the disclosure discussed herein relate to an insured vehicle analyzed by enhanced claims processing server 101, one of ordinary skill in the art would recognize that other types of insured items, including homes, may be employed with a similar scheme.

In certain aspects, the use of server 101 may aid in cutting down time between a first notice of loss and settlement of the claim (e.g., real-time settlement of a claim) associated with the loss (e.g., via a payment and/or information regarding repair/replacement of an insured item). In addition, because the methods discussed herein are automated and involve minimal and/or no involvement from claims adjusters, less time and money may be spent to transport these adjusters to inspection locations. The automated nature of this process may also create the opportunity for remote human inspections of damage associated with insured items.

Also, the technologies used in the claims adjustment processes implemented by server 101 may aid in attracting technology savvy consumers to an entity (e.g., an insurance company) managing server 101.

Figure 3:
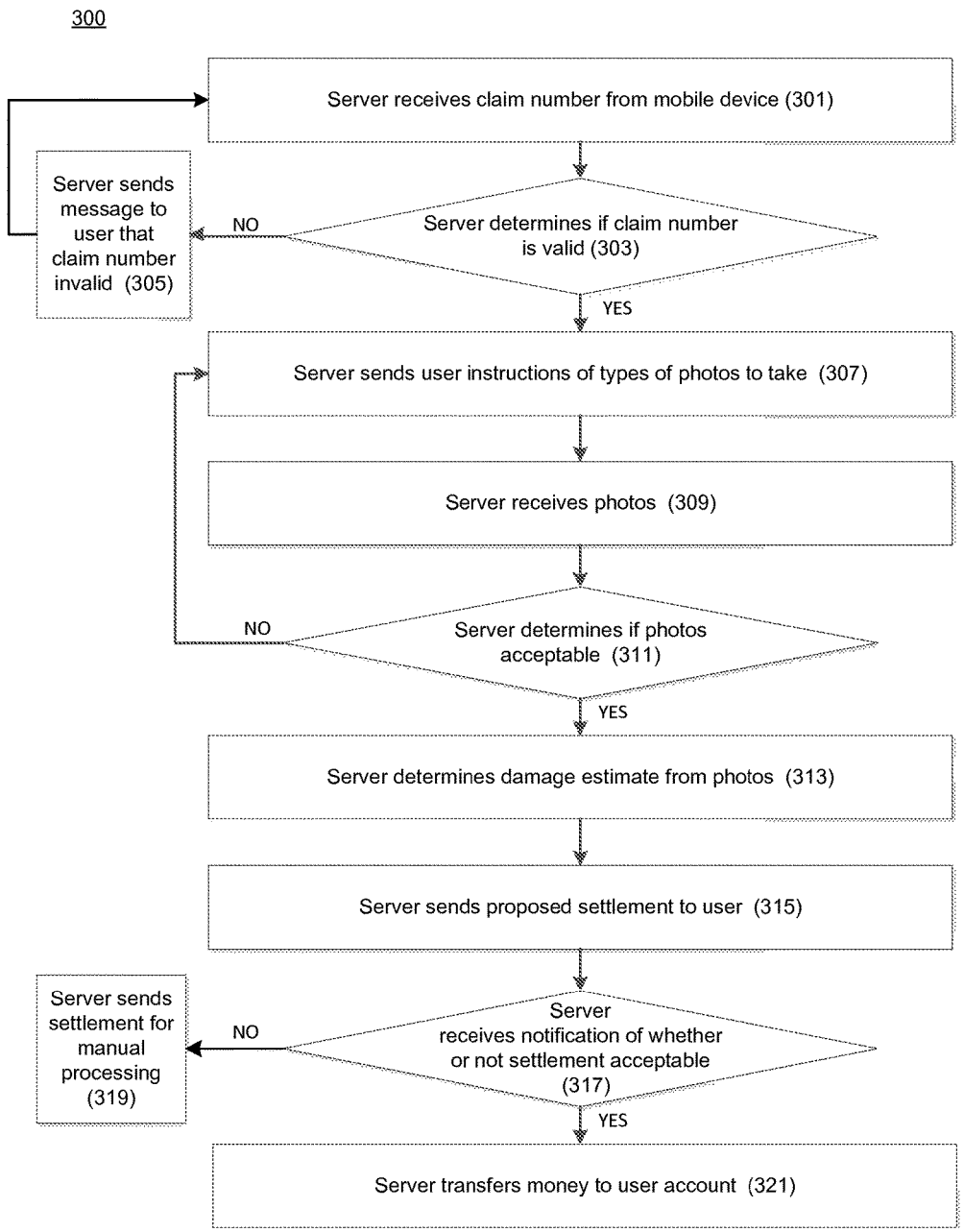
FIG. 3 shows a flow chart for an automated damage assessment process in accordance with certain aspects of the present disclosure.

FIG. 3 shows an automated damage assessment process 300 in accordance with at least one aspect of the present disclosure. In certain aspects, an application related to damage assessment and claims processing may be downloaded onto a mobile device (e.g., iPhone™, Android™, etc.) associated with a user (e.g., a customer of an insurance company) to facilitate one or more steps of the process in FIG. 3.

The process of FIG. 3 may start out at step 301 where a user (e.g., a customer) associated with an entity managing enhanced claims processing server 101 (e.g., insurance company) may enter a claim number (e.g., a number related to damage associated with an insured vehicle, etc.) into a damage assessment and claims processing application running on a mobile device (e.g., network device 201). To generate a claim number, a claimant may contact an entity managing enhanced claims processing server 101 (e.g., an insurance company, etc.) with a first notice of loss (FNOL). The claimant may contact the insurance company in any number of ways, including via phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided from a remote location (e.g., location of an accident, claimant's home, etc.) using an application loaded onto a smart phone (e.g., iPhone™, Android™, etc.).

The mobile device may then transmit the entered claim number and related information to enhanced claims processing server 101. The process may then move to step 303 where server 101 may determine if the claim number received in step 301 is valid. If server 101 determines that the claim number is not valid, then server 101 may transmit a message to the mobile device, stating that the claim number is invalid in step 305. The user may then enter another claim number (step 301).

If server 101 determines that the claim number is valid, the process may move to step 307 where server 101 may send the user instructions of the types of image data (e.g., photos, video, etc.) that should be captured of damage associated with the insured vehicle. It should also be noted that in some embodiments server 101 may not receive a claim number and may proceed in providing user instructions on the types of image data that should be captured without receiving a claim number. The user may receive instructions on various types of photos/video, including photos/video of the entire vehicle, VIN door tag, and/or the damaged areas. In some aspects, the user may capture image data related to at least two different angles of the damage for each panel (e.g., hood, fender, door, bumper, etc.) based on an initial claim description.

When the user of the mobile device receives these instructions, the user may use a camera associated with the mobile device to take the photos and transmit these photos to the server 101. The user may be allowed to preview each photo before selecting the image. Once a photo has been selected, the image may be shown on a display associated with the mobile device under a photo type (e.g., a photo of the entire vehicle, VIN door tag, and/or damaged area). If the user is not satisfied with any photo, the user may delete the photo by selecting it. In some aspects, the user may annotate the photos (e.g., by drawing a line from one end of the dent to the other, etc.) prior to transmitting them to server 101. In yet other embodiments, server 101 may itself annotate any received photos/video.

In some embodiments, any approved photo may not be sent to server 101 until all of the images have been captured. In some aspects, server 101 may support a website interface through which photos may be uploaded by a user of a mobile device. Also, the use of multiple photos (e.g., via stereoscopic techniques), video (e.g., by walking around the vehicle to generate a complete view), and/or three-dimensional photos/video may assist in determining the depth of damage to a vehicle. In some aspects, determining the depth of damage may help in classifying the damage (e.g., a turbulent dent versus a dish dent). In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured vehicle, a claims adjuster associated with an entity managing server 101 (e.g., an insurance company) may interface with the user in real-time (e.g., via phone, email, etc.) as the photos are being sent to the adjuster and/or as the video is being streamed to the adjuster and describe to the user the photos/video that still need to be taken and/or where to place a camera as the photos/video are captured.

After server 101 receives image data transmitted from a mobile device in step 309, server 101 (or an individual/group associated with the entity managing server 101) may determine if the photos are acceptable in step 311. For instance, server 101 may determine that the photos are too blurry and/or that the photos do not capture the correct angles to clearly show damage associated with the insured vehicle. As an example, server 101 may employ a bar code scanning mechanism and/or an optical character recognition (OCR) system for detecting the VIN from a submitted photo. In other aspects, the mobile device itself may use a bar code scanning mechanism and/or an OCR system for determining the VIN number. In this example, if the VIN cannot be detected from the photo and/or using these techniques, then the submitted photo may be deemed to be unacceptable. If server 101 determines that that the photos are not acceptable, the process may move back to step 307 where the server 101 may send the user instructions on what types of photos to take and/or what changes need to be made to the previously submitted photos. In yet other embodiments, a dispatcher associated with an entity managing server 101 (e.g., an insurance company) may determine if submitted photos are acceptable. In other embodiments, the mobile device may itself determine if any given photo is blurry and/or inaccurate and prompt the user to retake the photo. In this aspect, the application for damage assessment and claims processing running on the mobile device may have computer-executable instructions stored within a memory of the mobile device for automatically detecting and/or rejecting a photo/video captured within a given category.

If server 101 determines that the photos are acceptable, server 101 may attach the photos to the user's claim in a database associated with server 101. Server 101 may also determine a damage estimate (e.g., an estimate for repairing and/or replacing any damaged parts) after analyzing the photos in step 313 based on predefined rules. The damage estimate may be generated by comparing the photos submitted by the mobile device with photos of similarly damaged vehicles or with photos of non-damaged vehicles of similar make/model. To perform this comparison, server 101 may access a database (e.g., network device 201) of photos of vehicles with various types of damage and/or vehicles with no damage. To initially populate the database with photos for later use, each user may be required to upload various photos of a vehicle upon purchase of the vehicle. Also, as server 101 analyzes recently submitted photos, previously uploaded photos of a given vehicle may be used to determine any pre-existing damage on the vehicle. Once database 201 includes photos/video from many cases of vehicle damage, server 101 may determine a damage estimate for a new case based on the prior cases.

Server 101 may not need to build a new damage estimate piece-by-piece for a given damaged vehicle. In this regard, server 101 (or an individual/group associated with the entity managing server 101) may generate a new damage estimate based on a holistic view of a damaged vehicle. Over time, server 101 may build a database (e.g., network device 201) of specific damage templates (e.g., damages to more than one part of a vehicle that are commonly associated with one another) and estimated/actual costs for repairing damages associated with these templates. Once this database has been built, damage estimates associated with subsequently analyzed vehicles may be generated from a holistic view of the vehicles by accessing information within the historical database.

For instance, if a first type of damage to the front bumper of a vehicle is commonly associated with a second type of damage to the headlights of the same vehicle and this damage template is associated with a predetermined repair cost in the database, server 101 may use this repair cost to generate a new estimate for subsequent vehicles that exhibit damage similar to this damage template.

In one example, the damage estimates retrieved from the historical database may be adjusted based on differences associated with a current case. For instance, the damage estimate may be adjusted based on the average inflation rate (e.g., for parts, labor, etc.) between the date at which the damage estimate within the historical database was generated and the current date. In other embodiments, the damage estimate may be adjusted for small differences such as the make, model, and year of manufacture when the vehicle in the historical database and the currently analyzed vehicle are compared. Similarly, the damage estimate may be adjusted based on differences in the precise damage associated with the vehicle in the historical database and the damage associated with the vehicle currently being analyzed. In yet other examples, the damage estimate may be adjusted based on the terms of an insurance policy that covers damage to the insured vehicle currently being analyzed. One of ordinary skill in the art would understand that any number of factors may be considered when adjusting the damage estimate retrieved for vehicles stored in the historical database to more accurately reflect a damage estimate for a currently analyzed vehicle.

In other aspects, when a vehicle exhibits more than one type of damage, server 101 may access the historical database multiple times (one for each type of damage) and then add one or more interaction terms to the sum of the cost estimates for each type of damage. For instance, extending the example above of damage to a front bumper and to the headlights of a vehicle, server 101 may generate a first damage estimate for repairing the front bumper and a second damage estimate for repairing the headlights. Server 101 may then add these two damage estimates to generate a total damage estimate.

In this embodiment, server 101 may also calculate an interaction term (which may be a positive or a negative value) that represents either an increased (e.g., because the damages taken collectively introduce more complexity and are thus more expensive to repair than if handled individually) or decreased (e.g., because the damages taken collectively have overlapping repair procedures and are thus less expensive to repair than if handled individually) cost of repairing the vehicle when both of these types of damages occur together. The effective total damage estimate may then be the sum of the total damage estimate and the interaction term.

One of ordinary skill in the art would understand that a given damage template may be built based on any number of specific damage types/locations. In addition, server 101 may generate any number of interaction terms for a given analysis. For instance, if a damage estimate is based on damage to three parts of a vehicle, server 101 may generate interaction terms that relate to increased/decreased cost associated with repair to the following part groups: the first two parts, the first and third parts, the second and third parts, and all three parts at once. In other embodiments, server 101 may generate an interaction term for only some of the damaged parts.

In certain aspects, server 101 may also query the claimant with regards to the type of third party service provider (e.g., repair shop, etc.) they would prefer after damage analysis and claims processing is complete.

In other aspects, exterior damage associated with the vehicle may be used to predict (e.g., via predictive modeling using the database of past assessed exterior/interior damage for other similar cases, etc.) the likelihood of interior (e.g., mechanical, cabin, etc.) damage to the vehicle and/or potential difficulties in repairing the vehicle.

Once the image data has been analyzed, server 101 may include computer-executable instructions to recognize the extent of damage to various parts of the vehicle (e.g., chassis, etc.), including various types of dents and edge damage, and to identify various parts of the vehicle.

In some aspects, the detection of damage to the vehicle may be based on object recognition algorithms that compare images (e.g., comparing x, y, and z coordinates of each point on the images) of the vehicle in question to reference images of similar vehicles (e.g., same make, model, year of manufacture, etc.) with no damage. More specifically, server 101 may access a database of images storing the reference images of vehicles of various models and makes. By using object recognition/edge detection algorithms (e.g., involving blur filters, gray-scaling, custom algorithms, etc.), server 101 may determine where damage is located as well as the potential size/area of the damage. Server 101 may also access internal/external databases storing images, damage depth map information (e.g., from previously assessed analyses, etc.), and/or processed claims reports from damaged vehicles that server 101 has assessed previously. In particular, server 101 may access images/depth map information from previously assessed damaged vehicles for use as a guidepost in assessing the damage of a new vehicle. If no reference information (e.g., data, images) exists, axis symmetry information may also be used to identify possible irregularities and/or damage.

In some aspects, the algorithm employed by server 101 may use a comparison of an image of a damaged vehicle with an image of an undamaged version of the same vehicle to "subtract out" and isolate the damaged area of a vehicle. If an exact replica of an undamaged vehicle corresponding to a damaged vehicle under study is not available for this comparison, server 101 may further use various additional image processing algorithms, including blurring filters, etc. to detect a damaged portion of a vehicle.

In additional aspects, server 101 may grayscale all image data to make processing faster. Further, edge filters may be applied to both the image data from the damaged vehicle and its corresponding reference image data so that the edges of a damaged area may be "subtracted out" and identified in the image data of the damaged vehicle. Once the damaged area has been identified in the image data, server 101 may further process the damaged area to sharpen the area, to make the edges more prominent, and to fill any missing links found in the edges. Afterwards, server 101 may color, texture, and/or otherwise "fill in" the damaged area surrounded by the edges and extract the damaged area from the surrounding image data. Once the damaged area has been isolated, server 101 may calculate the precise area of the damage.

Similarly, server 101 may determine the depth of a damaged area (e.g., via stereoscopic methods, etc.) and may analyze raw depth data to further investigate points of interest (e.g., a point that has a much larger depth than surrounding points, etc.). Using this analysis, the damaged area may be further characterized (e.g., a dented area may be detected and if, for example, the general slope of the dent is high, the dent may be characterized as deep and rounded whereas if the slope is low, the dent may be characterized as shallow.)

In addition, if the server 101 retrieves image data or claims reports associated with a similar or the same previously analyzed vehicle that has similar or the same types of damage (e.g., as a result of a similar accident to a similar vehicle or part, etc.) as a vehicle currently being analyzed, server 101 may use a damage analysis or cost estimate of identifying/repairing the damage or replacing a damaged part of the previously analyzed vehicle to generate a damage analysis/cost estimate for the currently analyzed vehicle. In other words, server 101 may perform one or more database queries to match characteristics of the current analysis with previous analyses. For instance, the queries may seek to match the size, depth, and location of a dent on a current vehicle with a similar dent on a vehicle with a similar chassis configuration, make, model, and year of manufacture. For instance, consider a case where the vehicle in question is a new model that has not been analyzed before by server 101. In this scenario, server 101 may attempt to match the vehicle currently being analyzed with its closest match, which in this case may be a similar model from the previous year with the same chassis configuration (e.g., a twin chassis configuration).

In matching a vehicle currently being analyzed with one that has been previously analyzed, server 101 may assign a confidence factor to the match. Server 101 may assign the highest confidence factor (e.g., a confidence factor of 100%) to a comparison between the exact same types of vehicles (e.g., cars of the same make, model, year of manufacture, etc.) having the exact same type of damage (e.g., a predetermined type of dent, etc.). For instance, a comparison between vehicles with two completely different types of damage would have a confidence factor of 0%. As the similarities between the currently analyzed vehicle and previously analyzed vehicles are reduced, server 101 may assign a lower confidence factor to the comparison. For instance, output drawn from comparisons between vehicles of the same make and model but with different years of manufacture may be associated with a slightly lower confidence factor than 100%. In some aspects, confidence factors may decrease further when vehicles of different models and years of manufacture (e.g., vehicles with different chassis configurations, trim line configurations, etc.) but the same make are compared. In one embodiment, server 101 may assign a threshold confidence factor (e.g., 70%, etc.) below which output generated by a comparison performed by server 101 may not be considered reliable. If the confidence factor associated with a comparison between two vehicles falls below this threshold and there is no reliable comparison within the database, server 101 may then use physical details of the damage (e.g., size, location, area, etc.) to provide output such as a cost estimate for damage repair/replacement and/or the amount of time required for repair/replacement.

Server 101 may also use stored data to determine appropriate vendors for repairing/replacing the vehicle and the amount of time for repair/replacement. The wait time for repair/replacement may depend on various factors, including the size (e.g., area, depth, etc.), classification (e.g., turbulent dent, etc.), and location of the damage.

In addition, server 101 may determine if parts nearby to damaged parts may also need to be blended into the damaged area. In other words, if a part of the vehicle needs to be refinished (e.g., repainted) either because it is being replaced or repaired, parts within a predetermined distance of the repaired/replaced part may need to be blended (e.g., color-matched) to the repaired/replaced part.

In some aspects, server 101 may acquire the knowledge of all previous claims processed by server 101, as well as the knowledge of human adjusters, to accurately process future claims. In this way, server 101 may use machine learning to evolve its cost and/or repair estimation procedure based on past experience.

To estimate the cost and repair/replacement time associated with the damage to the vehicle and to determine whether to recommend that the vehicle be replaced or repaired, server 101 may also consider the extent/severity of the damage (area, depth, location, classification, etc.). For instance, damage to a character line (e.g., edge of a door associated with the vehicle) would be more difficult (e.g., more expensive and/or more time-consuming, etc.) to repair than damage to a more central location on the vehicle. Server 101 may also consider the actual cash value and the salvage value of the vehicle and any relevant local, state, and national laws in this analysis. In some aspects, server 101 may generate a rough cost estimate of repairing the damage just based on the extent of the damage; then server 101 may refine this estimate by analyzing previous cost estimates provided by server 101 and/or actual repair data received from third party service providers (e.g., repair shops, etc.) that have repaired similar vehicles with similar damage. In additional aspects, server 101 may generate a basic cost estimate by taking into account factors such as the number of hours predicted for the repair, the labor rate, and the current market conditions. In this aspect, server 101 may compare this basic cost estimate with the cost of merely replacing the vehicle (e.g., a total loss) or the damaged part within the vehicle and based on the comparison, server 101 may recommend the cheaper option. These estimates may also be transmitted to existing platforms (e.g., Audatex®, Mitchell®, etc.) for comparison purposes.

If the analyzed damage to the vehicle is different from the damage indicated by the claimant during the FNOL, server 101 may query the claimant as to the discrepancy. For instance, if the claimant initially provided information relating to damage on the left side of the vehicle but server 101 discovers that the primary damage occurred on the right side, server 101 may question the claimant as to when the damage occurred (e.g., was the damage due to a previous incident or preexisting condition?, is the claimant being truthful?, etc.). Server 101 may also ask the claimant to sign a statement as to the truth of the information provided. The claimant may have the option of answering the questions as they come up or the questions may be queued until the server 101 has finished processing the image analysis of the vehicle. If discrepancies between the claimant's answers and the analyzed damage to the vehicle continue to exist, server 101 may request the involvement of a human claims adjuster.

In other embodiments, a technician associated with an entity managing server 101 (e.g., an insurance company) may analyze the photos to determine a damage estimate. Also, in certain aspects, the process discussed herein may allow a user to upload photos/video that fall into alternative and/or additional categories (e.g., photos for each vehicle part, etc.).

As part of the image/video damage analysis, server 101 may ask the user to compare damage associated with the insured vehicle to damage depicted in a series of photos/video sent by server 101. In other embodiments, server 101 may request that the user classify the type of damage associated with the insured vehicle. For instance, server 101 may ask the user questions such as, "Does the damage to your vehicle look more like the damage shown in photo A or photo B?" Server 101 may ask any number of questions until server 101 has reached a clear understanding of all the damage to the insured vehicle and a damage estimate can be calculated. In some ways, this process may allow the user to estimate the damage to the insured vehicle.

As an example, consider a scenario where a driver's side door is dented and the driver's side window is cracked in a four-door sedan. Assume that the damage is centrally located on the driver's side window and door. Once server 101 receives a valid claim number related to this damaged sedan, server 101 may transmit, to a user device, one or more images depicting various types of damage to the driver's side window and door of four-door sedans that have been previously analyzed and/or stored in memory. The first image or images transmitted to the user device may be based on previously submitted information regarding an accident that caused the damage or any other type of input provided by a claimant and/or related parties. Thus, the first image or images transmitted to the user device may not depict damage that precisely conforms to the damage of the sedan currently being analyzed. For instance, if two images are initially transmitted to the user device, one of the images may depict damage to the corner of the driver's side window and door and the other image may depict damage that is located closer to the center. In this scenario, a user of the user device (e.g., a mobile phone), upon analyzing the two images, may select the image that depicts the centrally-located damage. The mobile device may then transmit the selection to server 101, and server 101 may use this information to generate a damage estimate.

Alternatively, suppose that both images initially transmitted from server 101 depict damage to the corner of the driver's side door and window in a four-door sedan. In this scenario, if both images are equally unrepresentative of the damage to the sedan in question, the user may transmit a message to server 101, stating how the reference images are equally unrepresentative. In response to this message, server 101 may transmit another image or images responsive to the information provided by the user in the message. Once again, the user may select one or more images that most closely depict damage to the sedan in question. Suppose that, on the second pass, server 101 again transmits two images and that, in this instance, both images depict damage to four-door sedans with centrally-located damage to the driver's side door and window. However, suppose that one of the images does not depict damage that is as severe as that exhibited by the sedan in question. In this scenario, the user may choose the image that depicts damage with the severity level consistent with the damage to the sedan in question.

By iterating through multiple rounds of image analysis and data exchange between server 101 and a user device, server 101 may, with each successive round, determine more precisely the damage associated with the sedan in question. When server 101 determines that the damage to the sedan has been fully characterized, server 101 may use the various responses provided by the user device to calculate a damage estimate for the damage to the sedan and transmit a settlement based on the calculated estimate.

In other embodiments, server 101 may transmit an insurance claim to a claims adjuster for manual processing of the claim if server 101 cannot calculate an accurate damage estimate after a predetermined number of question/answer rounds.

In additional embodiments, the user may transmit audio (e.g., by speaking into the mobile device, etc.) and/or an audio file that includes a description of what happened to cause the damage to the vehicle (e.g., the specifics of an accident, etc.). This audio/audio file may be translated into text and incorporated into the photos/video of damage and/or analyzed to determine if the damage matches any narrative description provided by the user. Also, the user may transmit a text file describing damage and/or an accident that caused the damage. In yet other embodiments, the user may capture and transmit the sound of the vehicle being started and/or the sound of the vehicle running to server 101 (e.g., to determine if a muffler associated with the damaged vehicle is broken, etc.).

Based on the analysis and the damage estimate, server 101 may transmit a proposed settlement (e.g., cash compensation, etc.) for the assessed loss to the user of the mobile device in step 315. After the user receives the proposed settlement, the user may notify server 101 whether or not the proposed settlement is acceptable in step 317.

If the settlement terms are not acceptable, then the process may move to step 319 where server 101 may transmit the settlement to a claims adjuster for manual processing. If the settlement terms are acceptable, the process may move to step 321 where server 101 may transfer any funds related to the assessed loss directly to a bank account associated with the user.

In some aspects, users may provide feedback designed to evaluate their experience through process 300. This feedback may be used to improve process 300 for future users and may involve the use of surveys, questionnaires, email, etc.

In other aspects, server 101 may determine and/or transmit supplemental adjustments to an initial damage/repair estimate. For instance, server 101 may determine that there is a 95% chance that repair option A must be performed, a 50% chance that additional repair option B must also be performed, and a 10% chance that additional repair option C must also be performed. When a repair shop examines the damage to a damaged vehicle and notices that there is less/additional damage, server 101 may use this information to revise an initial damage estimate with a supplemental adjustment to the initial estimate. Also, in cases where server 101 predicts that there may be many supplemental adjustments (e.g., above a predetermined threshold number of supplemental adjustments) to the initial estimate of damage, a claims adjuster may manually evaluate the damage and determine the likelihood of each of the supplemental adjustments.

In addition, server 101 may provide the user with a list of repair facilities for repairing the vehicle. Once the vehicle enters the repair process, messages may be pushed to the mobile device of the user to identify where the vehicle is located is in the repair process (e.g., which step of the repair process is the current step, etc.). These messages may identify who is working on the vehicle and/or may include photos/video of the vehicle as it is being repaired. The messages may also identify when the repair process may be completed.

In some aspects, some types of claims may be excluded from the automated process illustrated in FIG. 3. These claims may include comprehensive claims, claims with injuries to any involved parties, claims involving non-drivable vehicles or air bag deployments, claims with loss descriptions that include undercarriage/mechanical damage, claims involving motorcycle and/or recreational vehicle (RV) losses, and claims involving users that already have an estimate for damage associated with an insured vehicle.

Figure 4:
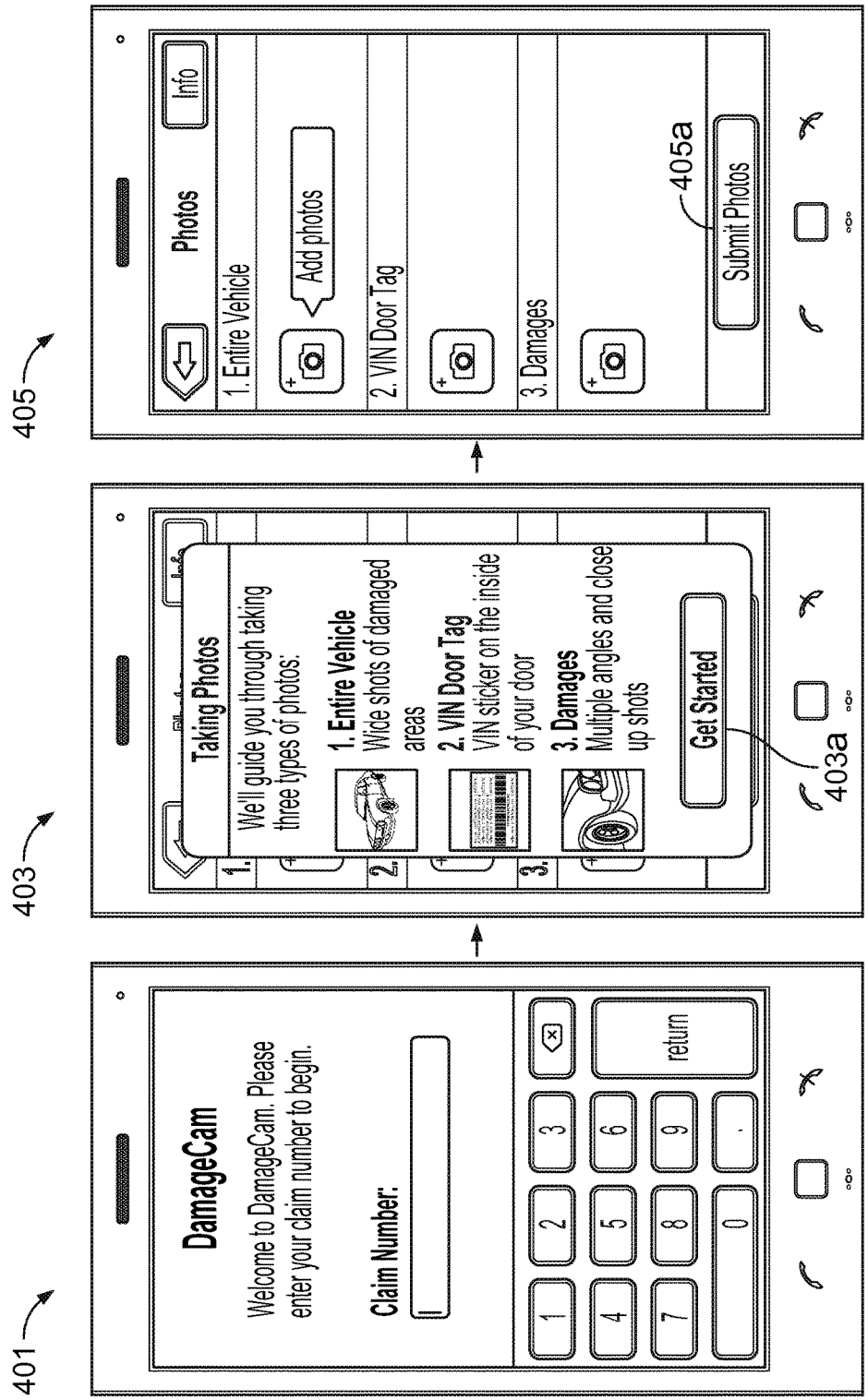
FIG. 4 shows a series of initial display screens displayed when a user starts a damage assessment and claims processing application stored on a mobile device in accordance with certain aspects of the present disclosure.

FIGS. 4-8 show various display screens displayed to a user of a mobile device in accordance with at least one aspect of the present disclosure. FIG. 4 shows a series of initial display screens displayed when a user starts a damage assessment and claims processing application stored on a mobile device (e.g., network device 201) in accordance with at least one aspect of the present disclosure. Screen 401 may be the initial screen that the user views upon starting the application. Screen 401 may allow the user to enter a claim number to begin a damage assessment and claims processing method. In certain aspects, the claim number may be used to compare a damage estimate generated by analysis of photos submitted by the user to a damage estimate generated manually by a claims adjuster using more conventional claims adjustment techniques. Once a user enters a valid claim number, the mobile device may display screen 403, where the user is presented with photo instructions that explain to the user the types of photos that should be taken. Screen 403 may include instructions on taking photos of the entire insured vehicle, VIN door tag, and any damaged areas of the insured vehicle. When a user presses the "Get Started" button 403*a* on screen 403, the mobile device may display screen 405, which allows a user to select and start taking any of the types of photos listed in screen 403 (e.g., photos of the entire vehicle, VIN door tag, and/or damaged areas). The "Submit Photos" button 405*a* on screen 405 may be inactive until at least one photo of each type is taken by the user.

Figure 5A:
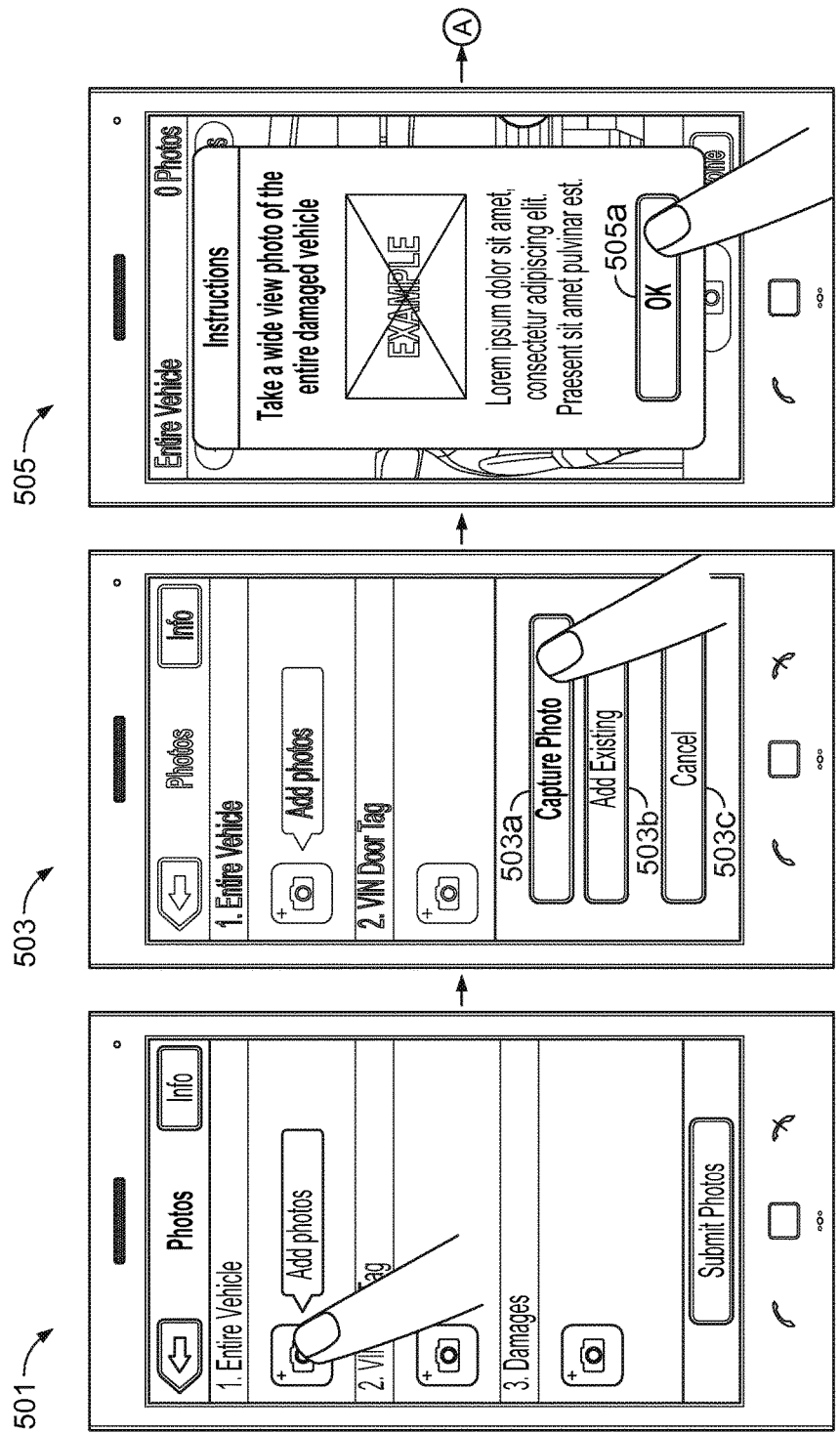
FIG. 5a shows the first part of a first series of display screens displayed on a mobile device as a user takes photos of a damaged vehicle in accordance with certain aspects of the present disclosure.

FIG. 5*a* shows the first part of a first series of display screens displayed on a mobile device as a user takes photos of a damaged vehicle in accordance with at least one aspect of the present disclosure. In display screen 501, the user may select to take a photo of the entire vehicle, the VIN door tag, and/or the specific damaged area(s). In the example of FIG. 5*a*, a user selects to take a photo of the entire vehicle. When a user selects one of the photo categories in screen 501, screen 503 may allow the user to select the "Capture Photo" button 503*a* to start the camera functionality within the mobile device, the "Adding Existing" button 503*b* to choose a photo from the photo roll, and/or the "Cancel" button 503*c* to cancel out of the previous command.

Figure 5B:
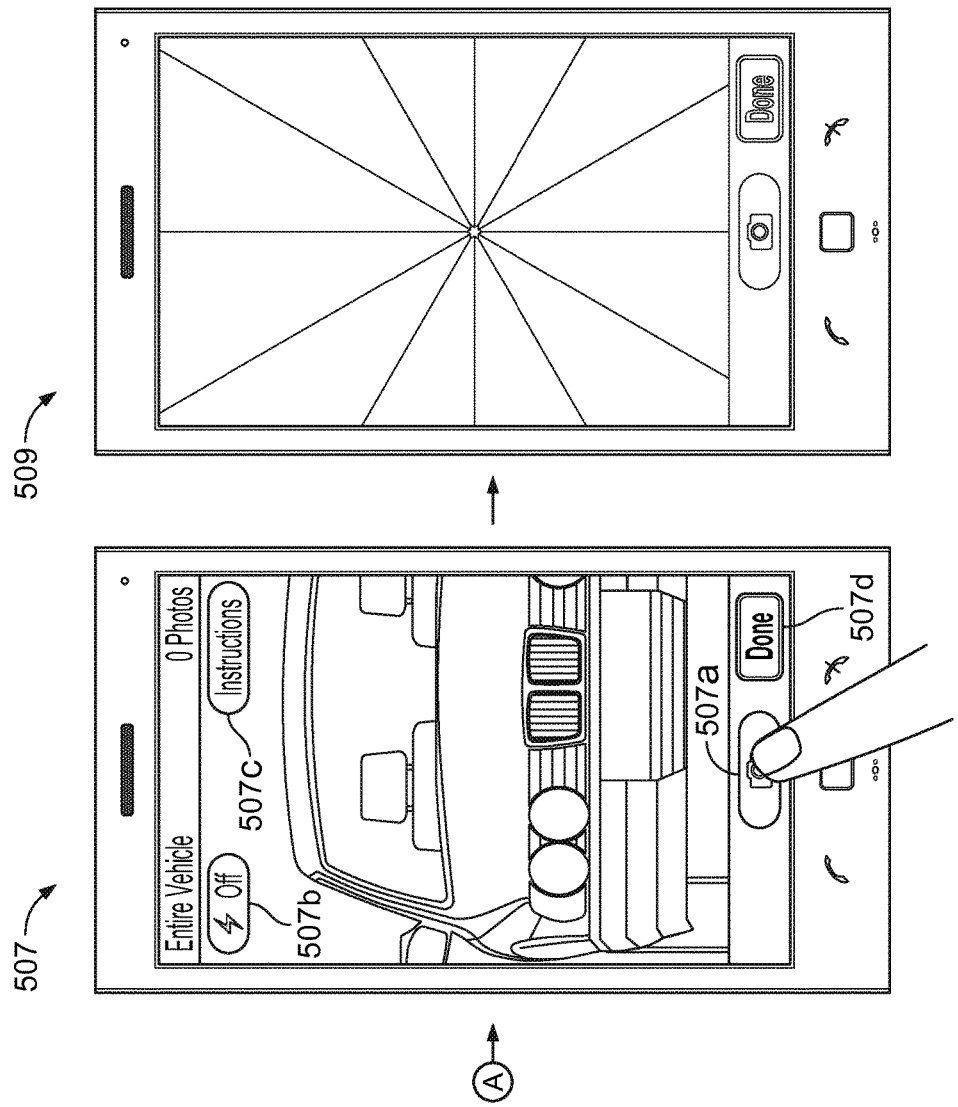
FIG. 5b shows the second part of a first series of display screens displayed on a mobile device as a user takes photos of a damaged vehicle in accordance with certain aspects of the present disclosure.

Assuming that the user selects the "Capture Photo" button 503*a* in screen 503, the mobile device may display screen 505 where instructions related to the current photo type (e.g., a wide view of the entire vehicle) may be overlaid on top of the camera. FIG. 5b shows the second part of a first series of display screens displayed on a mobile device as a user takes photos of a damaged vehicle in accordance with at least one aspect of the present disclosure. The user may select the "OK" button 505a on screen 505 of FIG. 5a to close the overlay and cause display of the camera screen 507 in FIG. 5b. Camera screen 507 may include a camera shutter button 507a (e.g., for taking a photo) and flash button 507b (e.g., for turning the camera flash on/off). The "Instructions" button 507c on screen 507 may open the instructions overlay from screen 505, and the "Done" button 507d on screen 507 may save all photos that have been taken to a memory of the mobile device and may return the user to the main photos screen 501. When the user selects the shutter button 507a in screen 507, the mobile device may display screen 509 to indicate that a photo is being taken. In some aspects, all buttons on screen 509 may be disabled after the user selects the shutter button 507a.

Figure 5C:
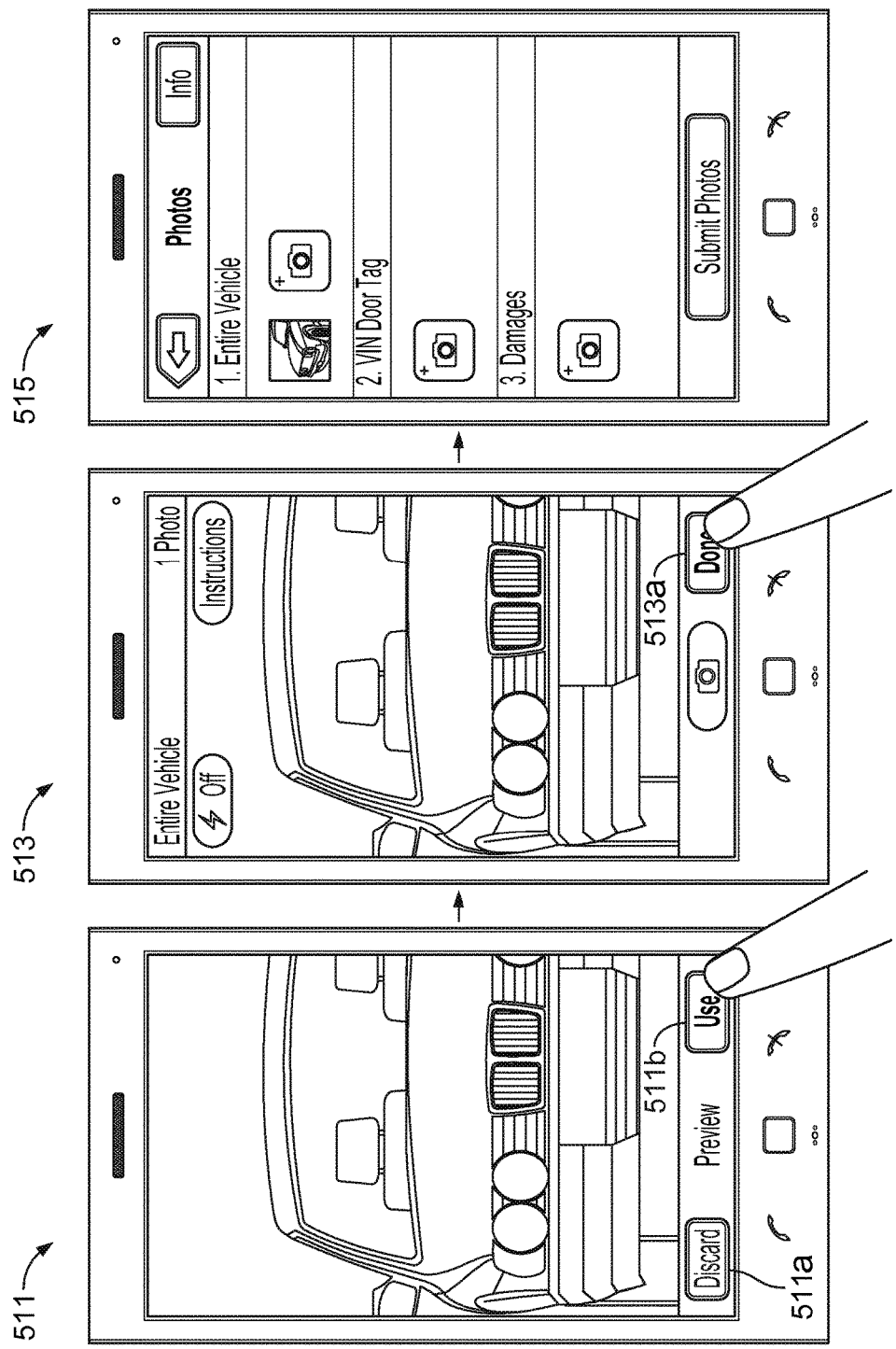
FIG. 5c shows a second series of display screens displayed on a mobile device as a user takes photos of a damaged vehicle in accordance with certain aspects of the present disclosure.

FIG. 5c shows a second series of display screens displayed on a mobile device as a user takes photos of a damaged vehicle in accordance with at least one aspect of the present disclosure. Screen 511 may allow a user to preview a photo that has been taken and take an appropriate action on this photo. In particular, the user may select a "Discard" button 511a to discard the photo or a "Use" button 511b to use the photo for damage assessment and claims processing. Assuming that the user selects "Use" button 511b, the user may proceed to take other photos within the selected photo type. When the user has taken all the photos of a given photo type, the user may select the "Done" button 513a on screen 513. After selecting the "Done" button 513a on screen 513, the mobile device may display screen 515, where thumbnail image(s) of the photo(s) that the user has already taken may be displayed in the corresponding categories.

Figure 6:
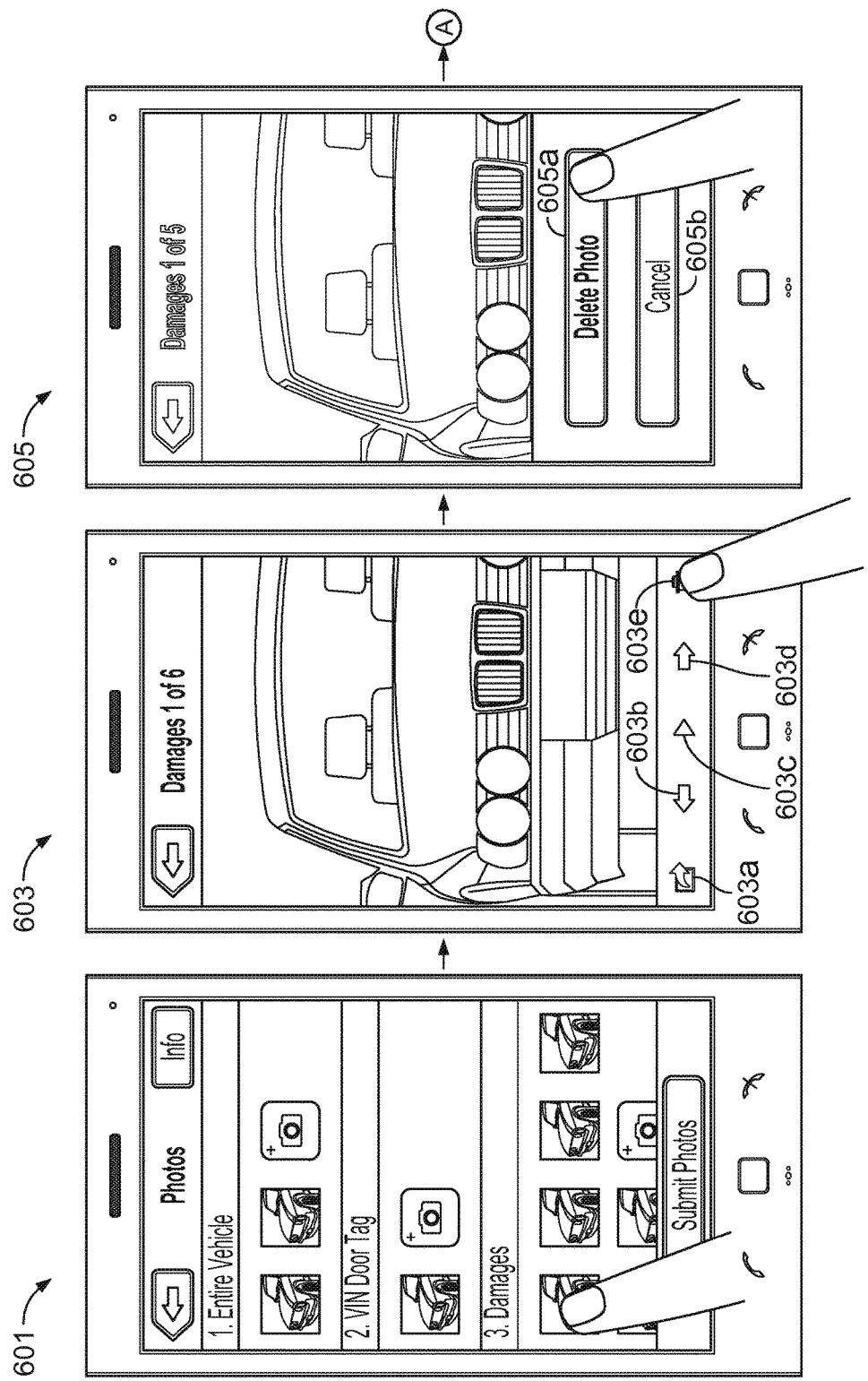
FIG. 6 shows the first part of a series of display screens displayed on a mobile device for enabling a user to delete photos that have already been taken in accordance with certain aspects of the present disclosure.
Figure 6A:
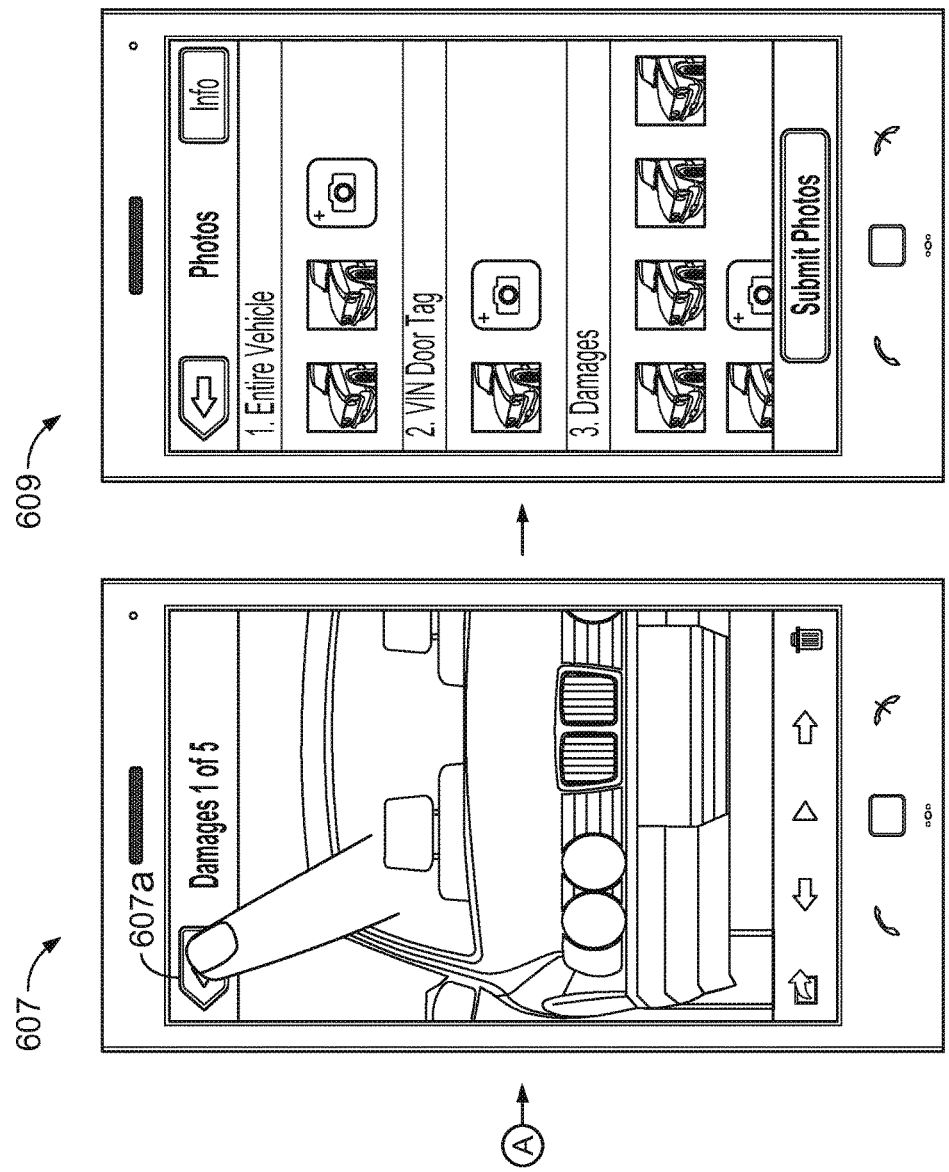
FIG. 6a shows the second part of a series of display screens displayed on a mobile device for enabling a user to delete photos that have already been taken in accordance with certain aspects of the present disclosure.

FIG. 6 shows the first part of a series of display screens displayed on a mobile device for enabling a user to delete photos that have already been taken in accordance with at least one aspect of the present disclosure. Screen 601 displays thumbnails of all photos that have already been taken. When a user selects one of the thumbnails in screen 601, the mobile device may display screen 603, where a series of buttons may be displayed, including an additional options button 603a for displaying additional options associated with the current photo (e.g., email photo, use photo as wallpaper, etc.), a scroll to previous photo button 603b for scrolling to the previously-viewed photo in the photo reel, a play photo reel button 603c for sequentially displaying each photo in the photo reel, a scroll to next photo button 603d for scrolling to the next photo in the reel, and a delete button 603e for deleting the currently-viewed photo. If the user selects delete button 603e, the photo currently displayed may be queued for deletion and mobile device may display screen 605. Screen 605 includes an action panel with a "Delete Photo" button 605a for confirming that the currently-viewed photo is to be deleted and a "Cancel" button 605b for cancelling deletion of the currently-viewed photo. FIG. 6a shows the second part of a series of display screens displayed on a mobile device for enabling a user to delete photos that have already been taken in accordance with at least one aspect of the present disclosure. If the user selects "Delete Photo" button 605a in FIG. 6, the currently-viewed photo is deleted and the next photo in the current category is displayed in screen 607 of FIG. 6a. If the user selects a back button 607a on screen 607, the user may back out to return to photos screen 609. Screen 609 may display the remaining thumbnails stored in a memory of the mobile device, with the image that the user deleted in screen 605 removed from the list of thumbnails.

Figure 7:
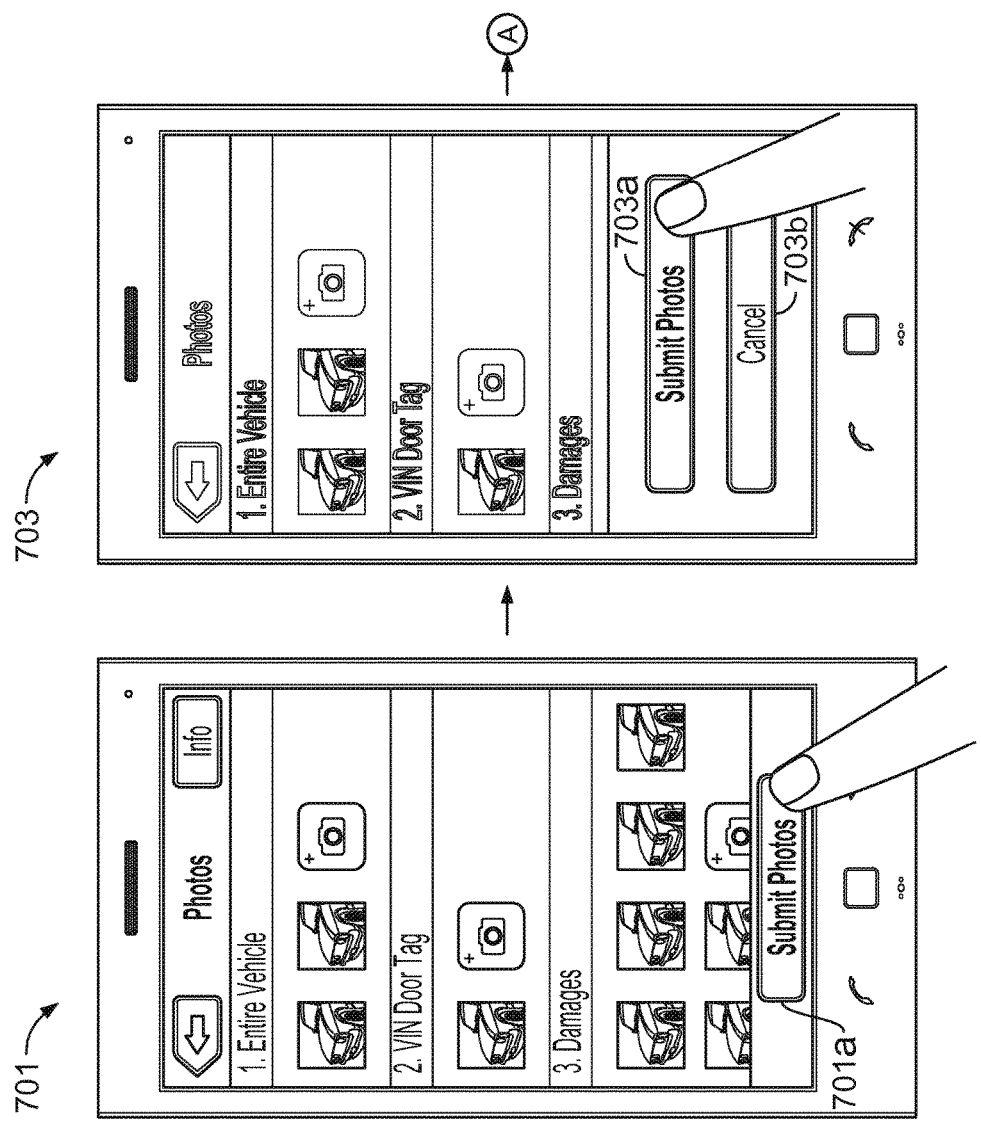
FIG. 7 shows the first part of a series of display screens displayed on a mobile device for enabling a user to submit photos for review by an enhanced claims processing server, in accordance with certain aspects of the present disclosure.
Figure 7A:
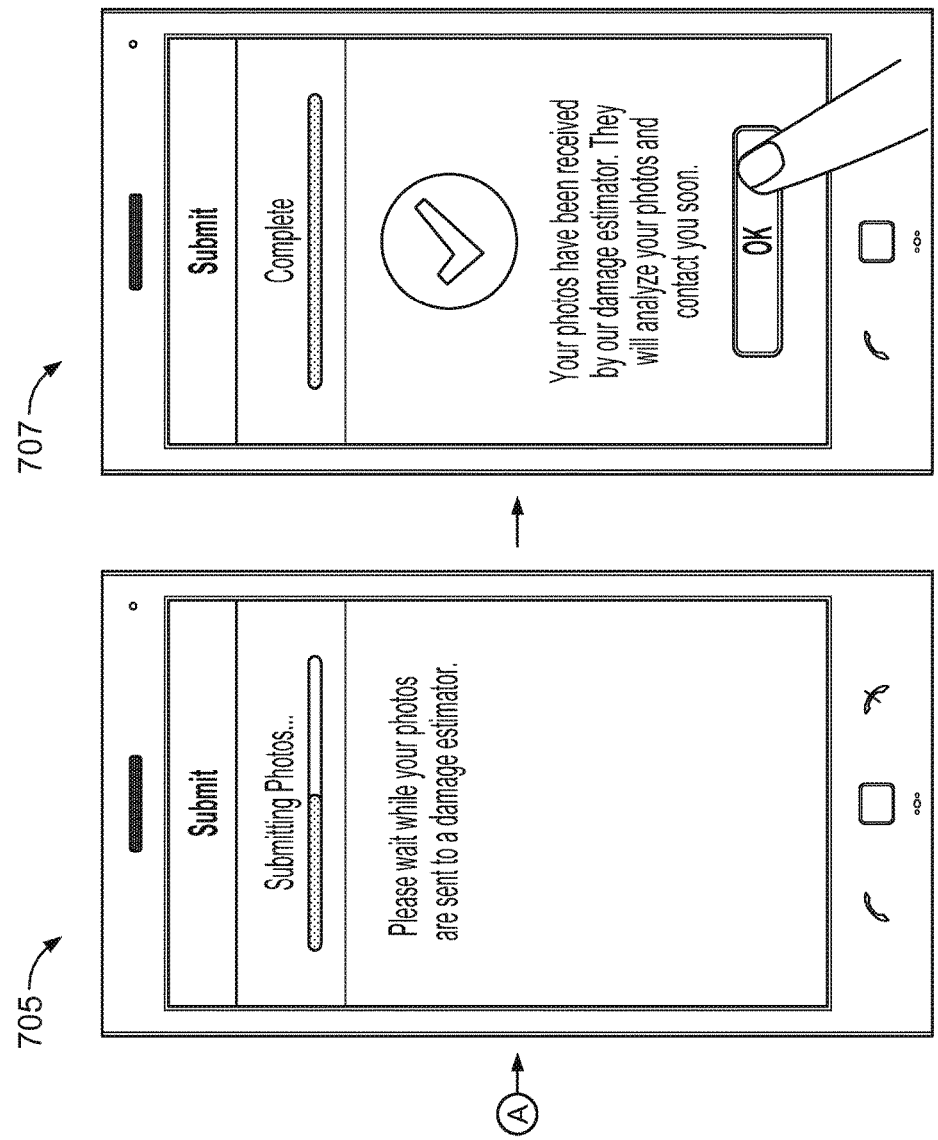
FIG. 7a shows the second part of a series of display screens displayed on a mobile device for enabling a user to submit photos for review by an enhanced claims processing server, in accordance with certain aspects of the present disclosure.

FIG. 7 shows the first part of a series of display screens displayed on a mobile device for enabling a user to submit photos for review by an enhanced claims processing server 101, in accordance with at least one aspect of the present disclosure. Screen 701 may include a "Submit Photos" button 701a for submitting photos to server 101 when all photos have been taken. When a user presses "Submit Photos" button 701a, the mobile device may display screen 703, which includes an action panel with the "Submit Photos" button 703a for confirming that the captured photos are to be submitted to server 101 and a "Cancel" button 703b for cancelling the submission. FIG. 7a shows the second part of a series of display screens displayed on a mobile device for enabling a user to submit photos for review by an enhanced claims processing server, in accordance with certain aspects of the present disclosure. If the user selects "Submit Photos" button 703a of FIG. 7, the mobile device may display screen 705 of FIG. 7a where an upload progress bar may indicate the progress of the photo upload. Once the photos have been fully uploaded, the mobile device may display screen 707, which indicates that the photos have been uploaded and explains any next steps that should be taken.

Figure 8:
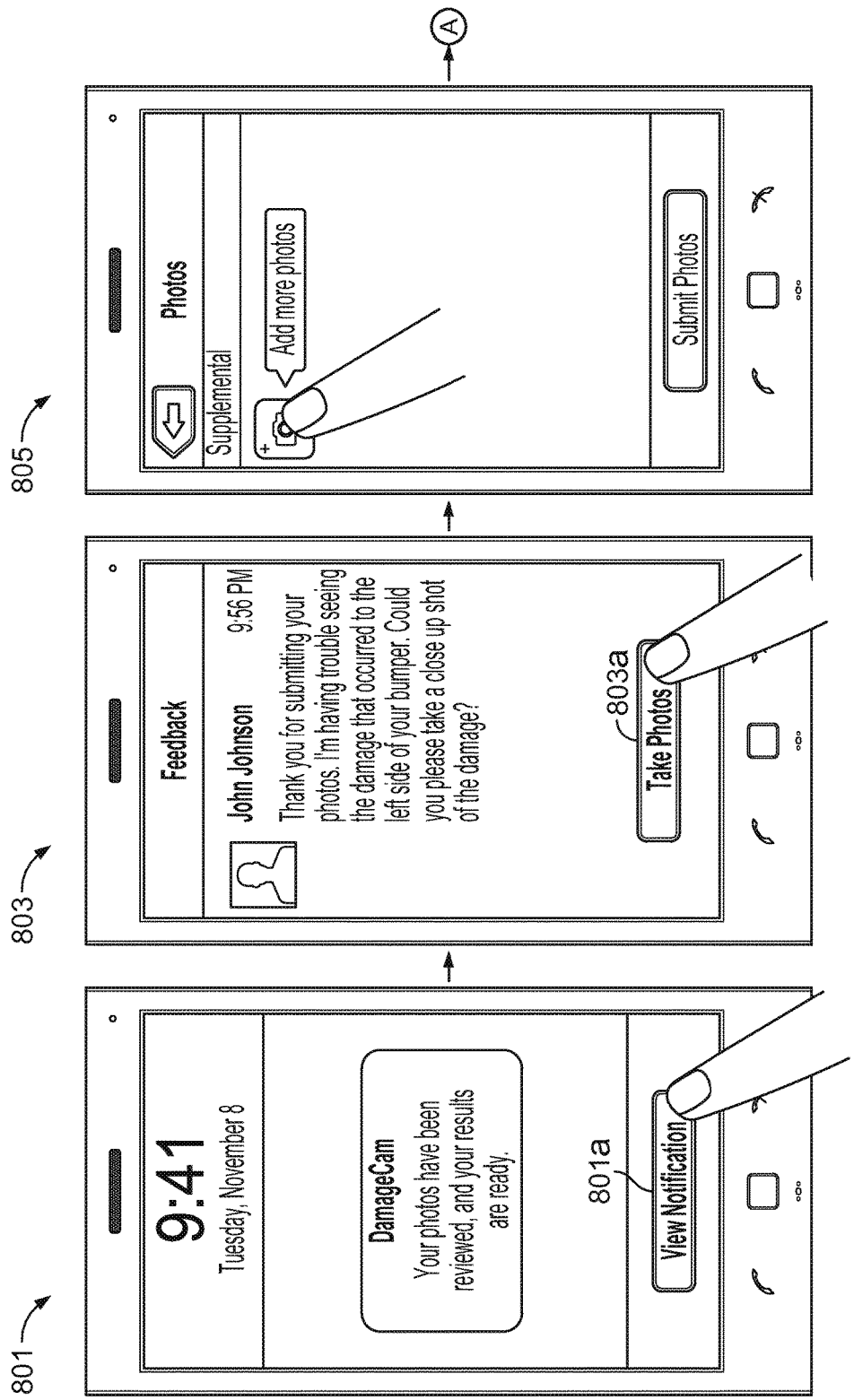
FIG. 8 shows the first part of a series of display screens displayed on a mobile device for enabling a user to receive feedback from an enhanced claims processing server regarding previously submitted photos, in accordance with certain aspects of the present disclosure.

FIG. 8 shows the first part of a series of display screens displayed on a mobile device for enabling a user to receive feedback from an enhanced claims processing server 101 regarding previously submitted photos, in accordance with at least one aspect of the present disclosure. When enhanced claims processing server 101 completes review of the photos submitted in FIG. 7, server 101 may transmit a notification to the mobile device that feedback is ready for review. When the mobile device receives the notification, screen 801, which includes a notification that feedback is ready, may be displayed. When a user selects the "View Notification" button 801a, the mobile device may display screen 803, which may include a detailed description of any feedback received from server 101. In this case, server 101 has transmitted a message that asks the user to take additional photos (e.g., of the damage to the left side of a bumper). Screen 803 may also include a "Take Photos" button 803a which may allow the user to take additional photos of the damaged vehicle. When the user presses "Take Photos" button 803a, the mobile device may display screen 805 which allows the user to take more photos of the damaged vehicle (e.g., in response to the feedback received in screen 803) using the same process depicted in FIGS. 5a, 5b, and 5c.

FIG. 8a shows the second part of a series of display screens displayed on a mobile device for enabling a user to receive feedback from an enhanced claims processing server regarding previously submitted photos, in accordance with at least one aspect of the present disclosure. Once all required photos have been taken, the user may press the "Submit Photos" button 807a in screen 807. to submit the photos taken via screen 805 to enhanced claims processing server 101. When the user presses the "Submit Photos" button 807a in screen 807, the mobile device may display screen 809, which includes a progress bar that shows the progress of the photo upload to server 101.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A method comprising:
   executing, by an enhanced claims processing server, an automated claims processing process comprising:
   transmitting, by an enhanced claims processing server, instructions to a mobile device to capture image data related to a damage of an insured item;
   receiving, by the enhanced claims processing server, from a software application executing on the mobile device, and via a website interface of the enhanced claims processing server, captured image data related to the damage of the insured item;
   automatically applying an optical character recognition system to the captured image data to extract data from the captured image data;
   automatically determining that the captured image data is acceptable based on the data extracted from captured image data;
   automatically identifying one or more edges surrounding a plurality of damaged areas of the insured item by applying one or more edge filters to the captured image data;
   automatically extracting the plurality of damaged areas of the insured item from the captured image data based on the one or more edges;
   automatically accessing, via a communications link, a database storing a plurality of reference data images related to damaged items similar to the insured item based on the captured image data related to the damage of the insured item;
   automatically determining at least one of the plurality of reference data images that depicts a first item most similar to the insured item and that depicts damages most similar to the plurality of damaged areas associated with the insured item, wherein the determining is performed by the enhanced claims processor by using one or more object recognition algorithms to compare the captured image data and the plurality of reference data images;
   automatically accessing, within the database, at least one damage template associated with the at least one of the plurality of reference data images, wherein the database stores historical damage estimate data;
   automatically retrieving a confidence factor associated with the damage template; and
   responsive to a determination that the confidence factor is above a threshold, automatically adjusting, by the enhanced claims processor, at least one damage estimate associated with the at least one damage template to calculate a new damage estimate for the insured item based on a difference between damage to the insured item and damage to the first item.

2. The method of claim 1, further comprising transforming the captured image data into a grayscale version of the captured image data.

3. The method of claim 1, further comprising: based on the new damage estimate, determining, at the enhanced claims processor, a settlement for settling an insurance claim.

4. The method of claim 3, further comprising: transmitting the settlement to the mobile device.

5. The method of claim 4, further comprising: receiving, from the mobile device, a notification detailing whether or not the settlement is acceptable.

6. The method of claim 5, further comprising: responsive to a determination that the settlement is acceptable, transmitting funds described in the settlement to an account of a user associated with the insured item.

7. The method of claim 5, further comprising: responsive to a determination the settlement is not acceptable, transmitting the settlement to a claims adjuster for manual processing of the insurance claim.

8. The method of claim 1, further comprising annotating, by the enhanced claims processing server, the captured image data.

9. The method of claim 1, wherein the at least one damage estimate is adjusted based on an average inflation rate between a first date at which the least one damage estimate was generated and a second date at which the new damage estimate is calculated.

10. The method of claim 1, wherein the at least one damage estimate is adjusted based on actual repair cost data.

11. The method of claim 1, wherein the at least one damage estimate is adjusted based on terms laid out in an insurance policy related to an insurance claim.

12. A system comprising:
    an insured item, wherein the insured item comprises a plurality of damaged areas;
    a processor; and
    a memory storing computer-readable instructions that, when executed by the processor, cause the processor to:
    execute an automated claims processing process comprising:
    transmit instructions to a mobile device to capture image data related to a damage of the insured item;
    receive, from a software application executing on the mobile device, and via a website interface, captured image data related to the damage of the insured item;
    automatically apply an optical character recognition system to the captured image data to extract data from the captured image data;
    automatically determine that the captured image data is acceptable based on the data extracted from captured image data;
    automatically identify one or more edges surrounding a plurality of damaged areas of the insured item by applying one or more edge filters to the captured image data;
    automatically extract the plurality of damaged areas of the insured item from the captured image data based on the one or more edges;
    automatically access, via a communications link, a database storing a plurality of reference data images related to damaged items similar to the insured item based on the captured image data related to the damage of the insured item;
    automatically determine at least one of the plurality of reference data images that depicts a first item most similar to the insured item and that depicts damages most similar to the plurality of damaged areas associated with the insured item, wherein the determining is performed by using one or more object recognition algorithms to compare the captured image data and the plurality of reference data images;

automatically access, within the database, at least one damage template associated with the at least one of the plurality of reference data images, wherein the database stores historical damage estimate data;

automatically retrieve a confidence factor associated with the damage template; and responsive to a determination that the confidence factor is above a threshold, automatically adjust at least one damage estimate associated with the at least one damage template to calculate a new damage estimate for the insured item based on a difference between damage to the insured item and damage to the first item.

13. The system of claim 12, the memory storing computer-readable instructions that, when executed by the processor, further cause the processor to transform the captured image data into a grayscale version of the captured image data.

14. The system of claim 12, the memory storing computer-readable instructions that, when executed by the processor, further cause the processor to determine a settlement for settling an insurance claim based on the new damage estimate.

15. The system of claim 14, the memory storing computer-readable instructions that, when executed by the processor, further cause the processor to transmit the settlement to the mobile device.

16. The system of claim 12 the memory storing computer-readable instructions that, when executed by the processor, further cause the processor to annotate the captured image data.

17. An apparatus comprising:
a processor; and
a memory storing computer-readable instructions that, when executed by the processor, cause the processor to:
execute an automated claims processing process comprising:
transmit instructions to a mobile device to capture image data related to a damage of an insured item;
receive, from a software application executing on the mobile device, and via a website interface, captured image data related to the damage of the insured item;
automatically apply an optical character recognition system to the captured image data to extract data from the captured image data;
automatically determine that the captured image data is acceptable based on the data extracted from captured image data;
automatically identify one or more edges surrounding a plurality of damaged areas of the insured item by applying one or more edge filters to the captured image data;
automatically access, via a communications link, a database storing a plurality of reference data images related to damaged items similar to the insured item based on the captured image data related to the damage of the insured item;
automatically determine at least one of the plurality of reference data images that depicts a first item most similar to the insured item and depicts damages most similar to the plurality of damaged areas associated with the insured item, wherein the determining is performed by using one or more object recognition algorithms to compare the captured image data and the plurality of reference data images;
automatically access, within the database, at least one damage template associated with the at least one of the plurality of reference data images, wherein the database stores historical damage estimate data;
automatically retrieve a confidence factor associated with the damage template; and
responsive to a determination that the confidence factor is above a threshold, automatically adjust at least one damage estimate associated with the at least one damage template to calculate a new damage estimate for the insured item based on a difference between damage to the insured item and damage to the first item.

18. The apparatus of claim 17, the memory storing computer-readable instructions that, when executed by the processor, further cause the processor to transform the captured image data into a grayscale version of the captured image data.

19. The apparatus of claim 17, the memory storing computer-readable instructions that, when executed by the processor, further cause the processor to determine a settlement for settling an insurance claim based on the new damage estimate.

20. The apparatus of claim 19, the memory storing computer-readable instructions that, when executed by the processor, further cause the processor to transmit the settlement to the mobile device.

* * * * *

UNITED STATES PATENT AND TRADEMARK OFFICE
CERTIFICATE OF CORRECTION

PATENT NO. : 10,430,885 B1
APPLICATION NO. : 13/587635
DATED : October 1, 2019
INVENTOR(S) : Brandmaier et al.

Page 1 of 1

It is certified that error appears in the above-identified patent and that said Letters Patent is hereby corrected as shown below:

In the Specification

Column 16, Detailed Description, Line 56:
Delete "807." and insert --807,--

In the Claims

Column 18, Line 1:
Claim 3, after "comprising:", insert --¶--

Column 18, Line 5:
Claim 4, after "comprising:", insert --¶--

Column 18, Line 7:
Claim 5, after "comprising:", insert --¶--

Column 18, Line 10:
Claim 6, after "comprising:", insert --¶--

Column 18, Line 14:
Claim 7, after "comprising:", insert --¶--

Column 19, Line 34:
Claim 16, after "claim 12", insert --,--

Signed and Sealed this
Twenty-ninth Day of December, 2020

Andrei Iancu
*Director of the United States Patent and Trademark Office*